US011662952B2

(12) United States Patent
Kanno

(10) Patent No.: US 11,662,952 B2
(45) Date of Patent: May 30, 2023

(54) MEMORY SYSTEM AND METHOD OF CONTROLLING NONVOLATILE MEMORY AND FOR REDUCING A BUFFER SIZE

(71) Applicant: KIOXIA CORPORATION, Tokyo (JP)

(72) Inventor: Shinichi Kanno, Ota (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/852,840

(22) Filed: Jun. 29, 2022

(65) Prior Publication Data

US 2022/0334771 A1   Oct. 20, 2022

Related U.S. Application Data

(63) Continuation of application No. 16/815,950, filed on Mar. 11, 2020, now Pat. No. 11,409,467.

(30) Foreign Application Priority Data

Aug. 28, 2019 (JP) .............................. JP2019-155832

(51) Int. Cl.
*G06F 3/06* (2006.01)
(52) U.S. Cl.
CPC .......... *G06F 3/0659* (2013.01); *G06F 3/0604* (2013.01); *G06F 3/0656* (2013.01); *G06F 3/0679* (2013.01)
(58) Field of Classification Search
CPC .... G06F 3/0659; G06F 3/0679; G06F 3/0656; G06F 3/0604; G06F 3/0683
See application file for complete search history.

(56) References Cited

U.S. PATENT DOCUMENTS

| 9,026,722 | B2 | 5/2015 | Kamphenkel et al. |
| 10,061,710 | B2 | 8/2018 | Kawamura et al. |
| 10,452,301 | B1* | 10/2019 | Farhan .................. G06F 3/0656 |
| 2016/0070336 | A1 | 3/2016 | Kojima |
| 2016/0032101 | A1 | 11/2016 | Hashimoto |
| 2016/0321010 | A1* | 11/2016 | Hashimoto ......... G06F 12/0246 |
| 2017/0228157 | A1* | 8/2017 | Yang .................... G06F 3/0659 |
| 2018/0165014 | A1* | 6/2018 | Jiang .................. G06F 12/0868 |
| 2019/0065075 | A1 | 2/2019 | Nagarajan |
| 2020/0135270 | A1 | 4/2020 | Lee |

FOREIGN PATENT DOCUMENTS

WO   WO 2015/114754 A1   8/2015

* cited by examiner

*Primary Examiner* — Michelle T Bechtold
(74) *Attorney, Agent, or Firm* — Oblon, McClelland, Maier & Neustadt, L.L.P.

(57) ABSTRACT

According to one embodiment, a memory system determines, for each of groups corresponding to streams, whether or not a length of write data associated with a set of write commands belonging to a same group reaches a minimum write size of a nonvolatile memory. When a length of write data associated with a set of write commands belonging to a first group corresponding to a first stream reaches the minimum write size, the memory system transfers the write data associated with the set of write commands belonging to the first group from a write buffer in a memory of the host to a first buffer in the memory system, and writes the write data transferred to the first buffer to a first write destination block corresponding to the first stream.

7 Claims, 15 Drawing Sheets

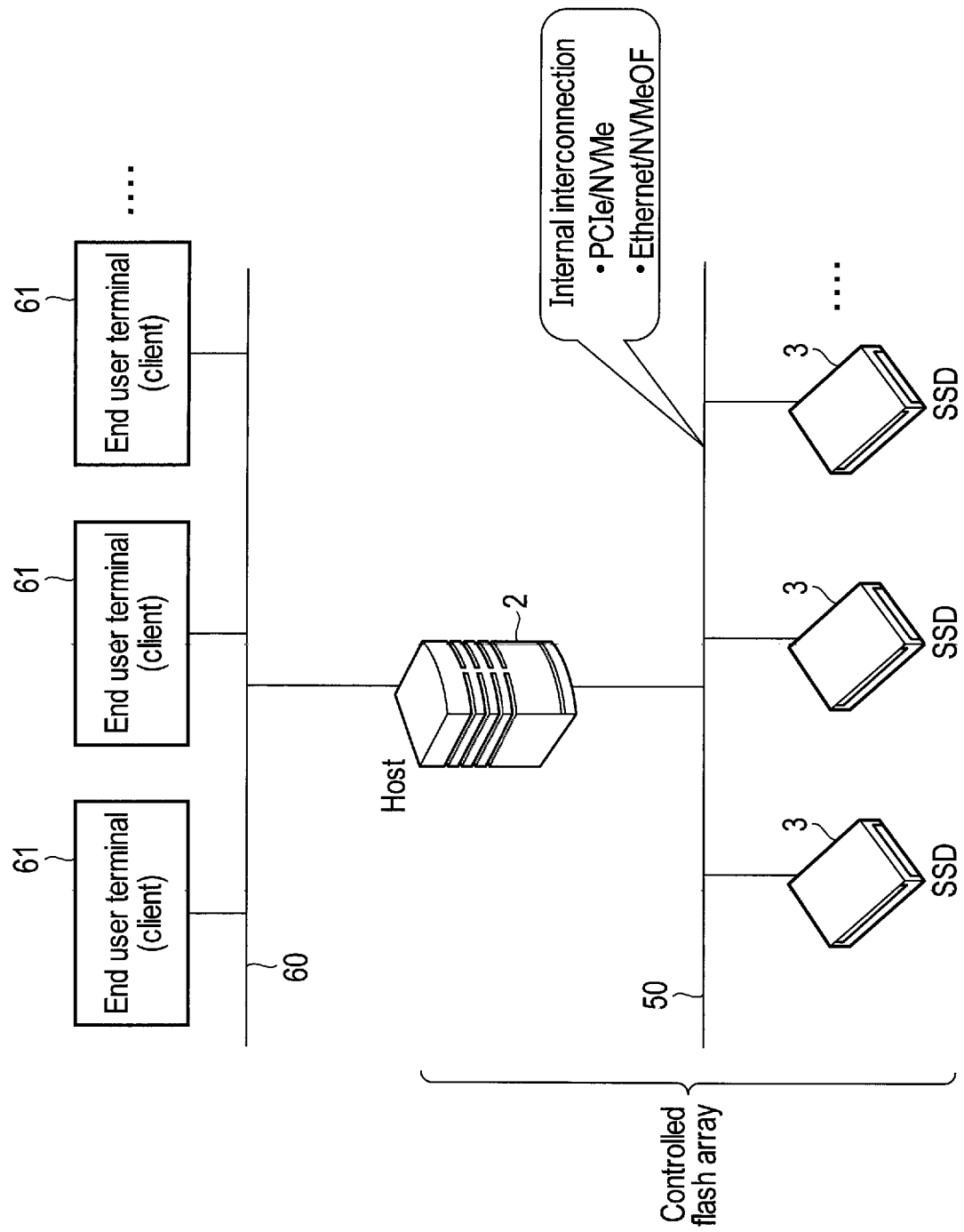
F I G. 1

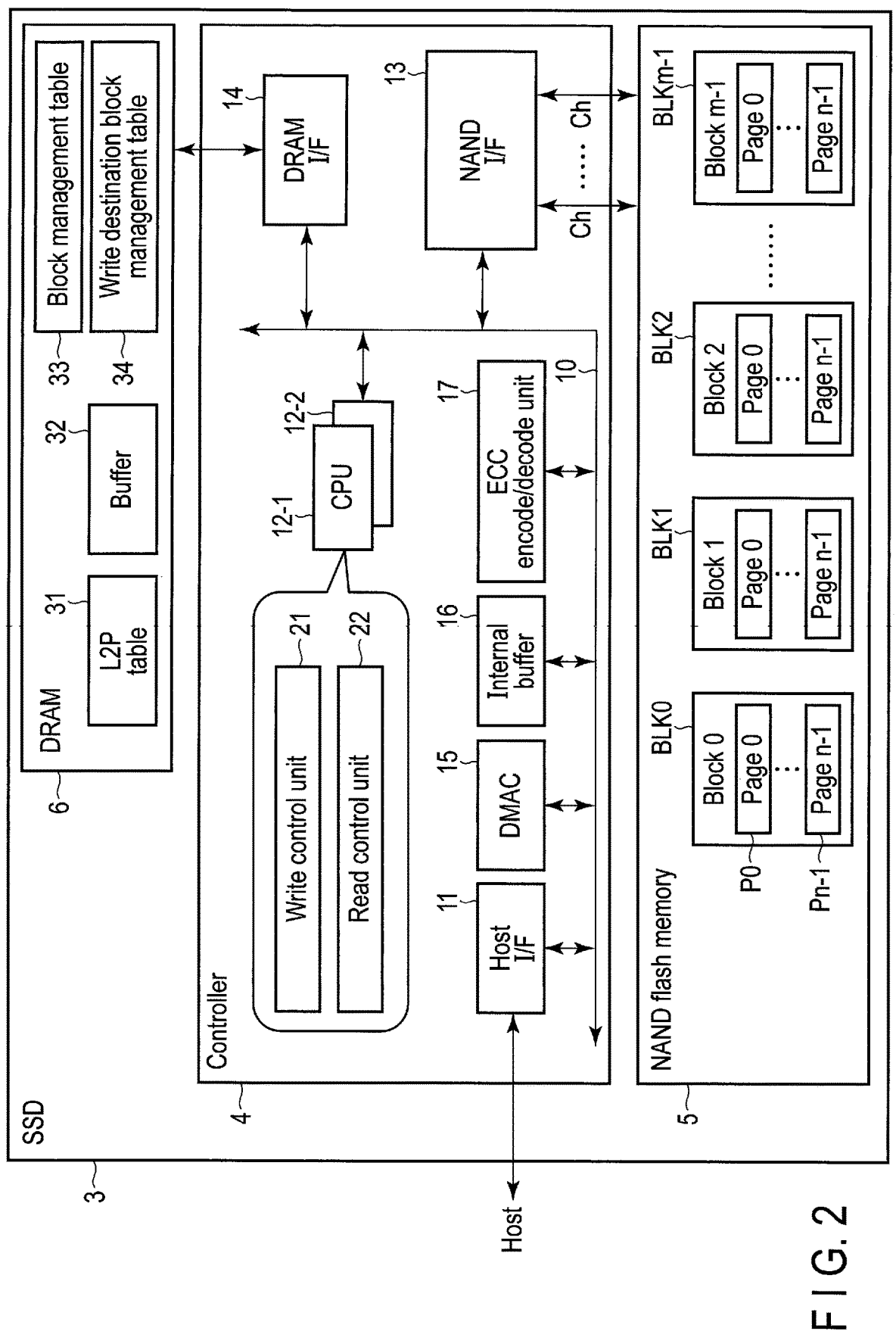
F I G. 2

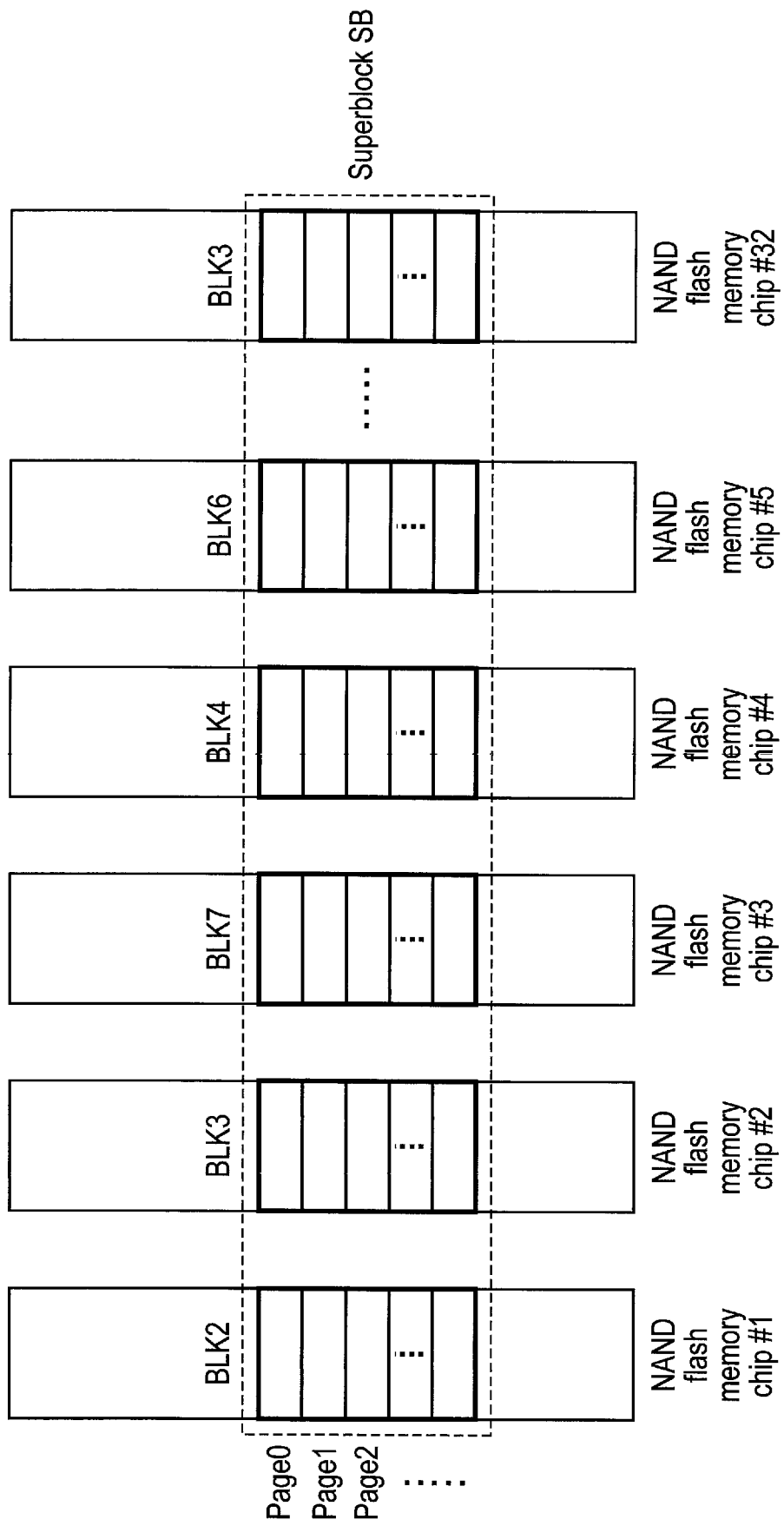
F I G. 4

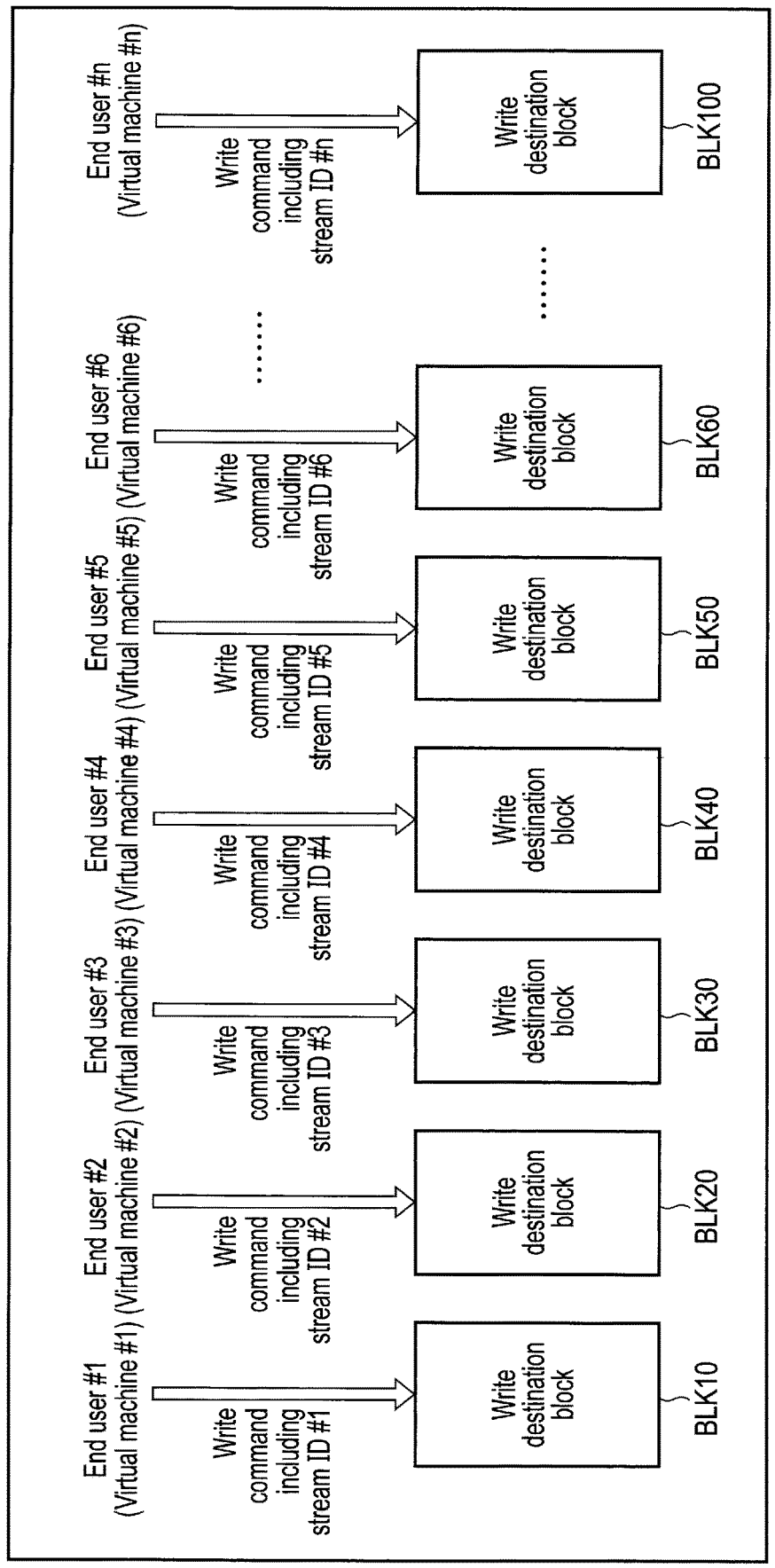
F I G. 5

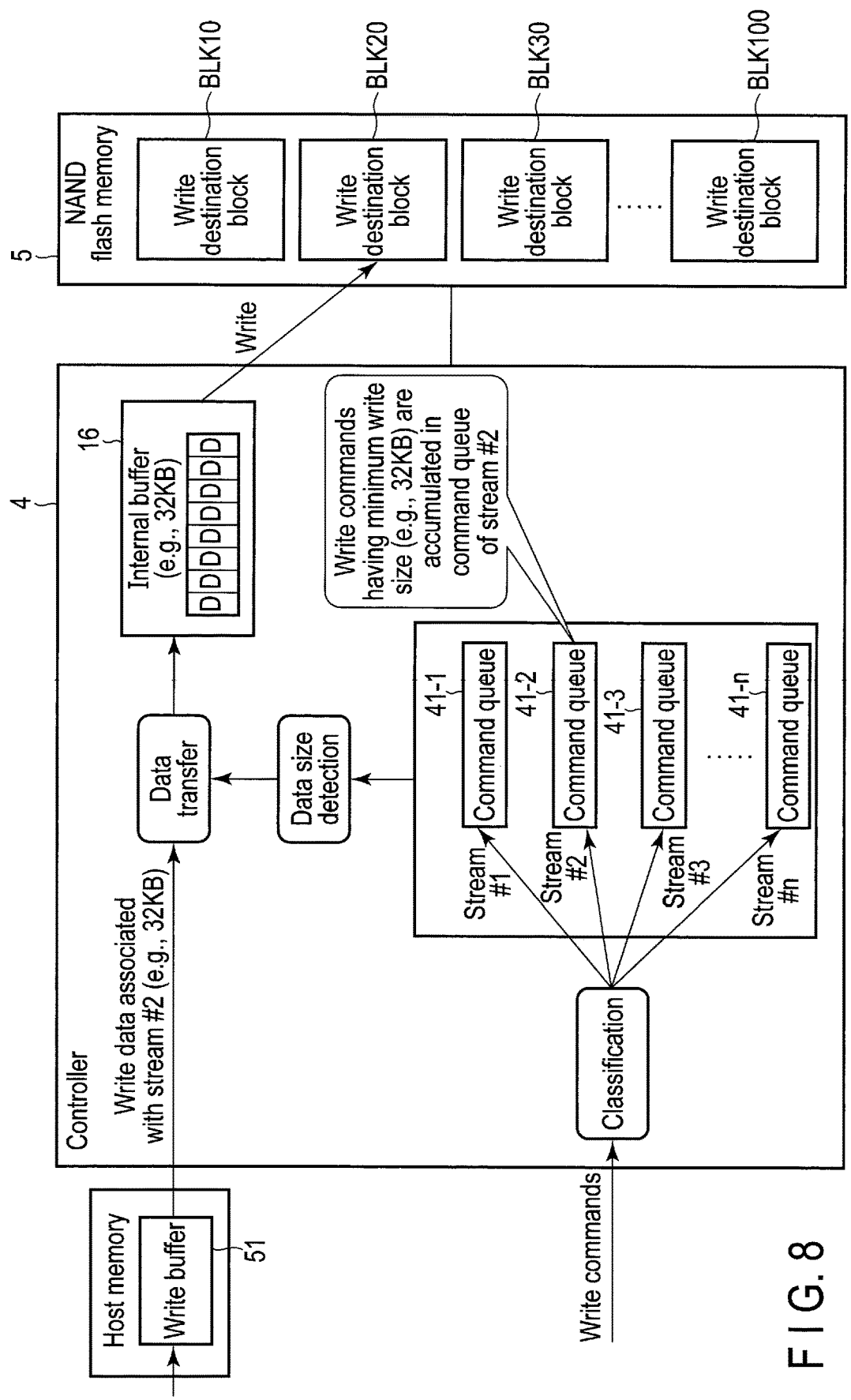
F I G. 8

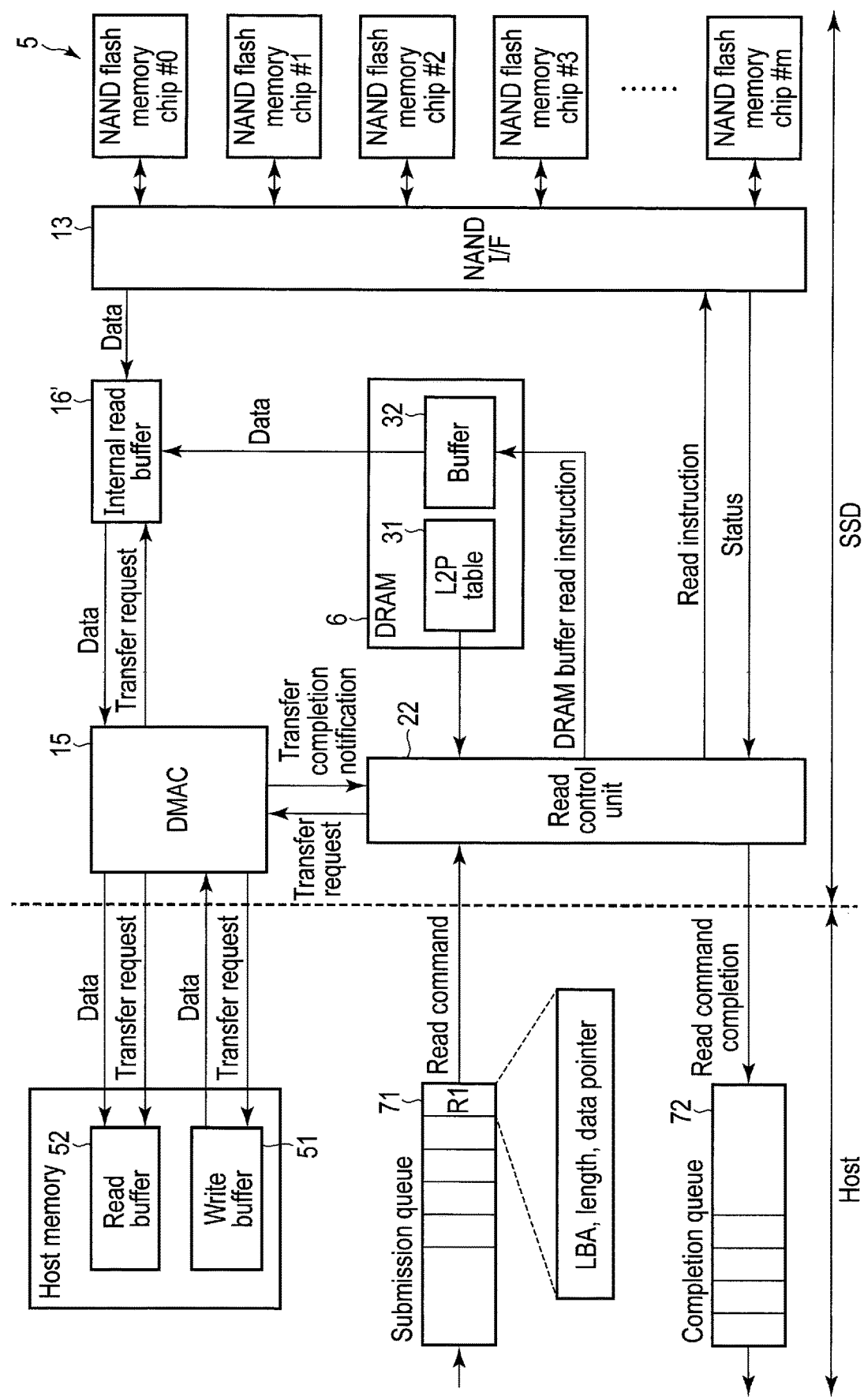
F I G. 11

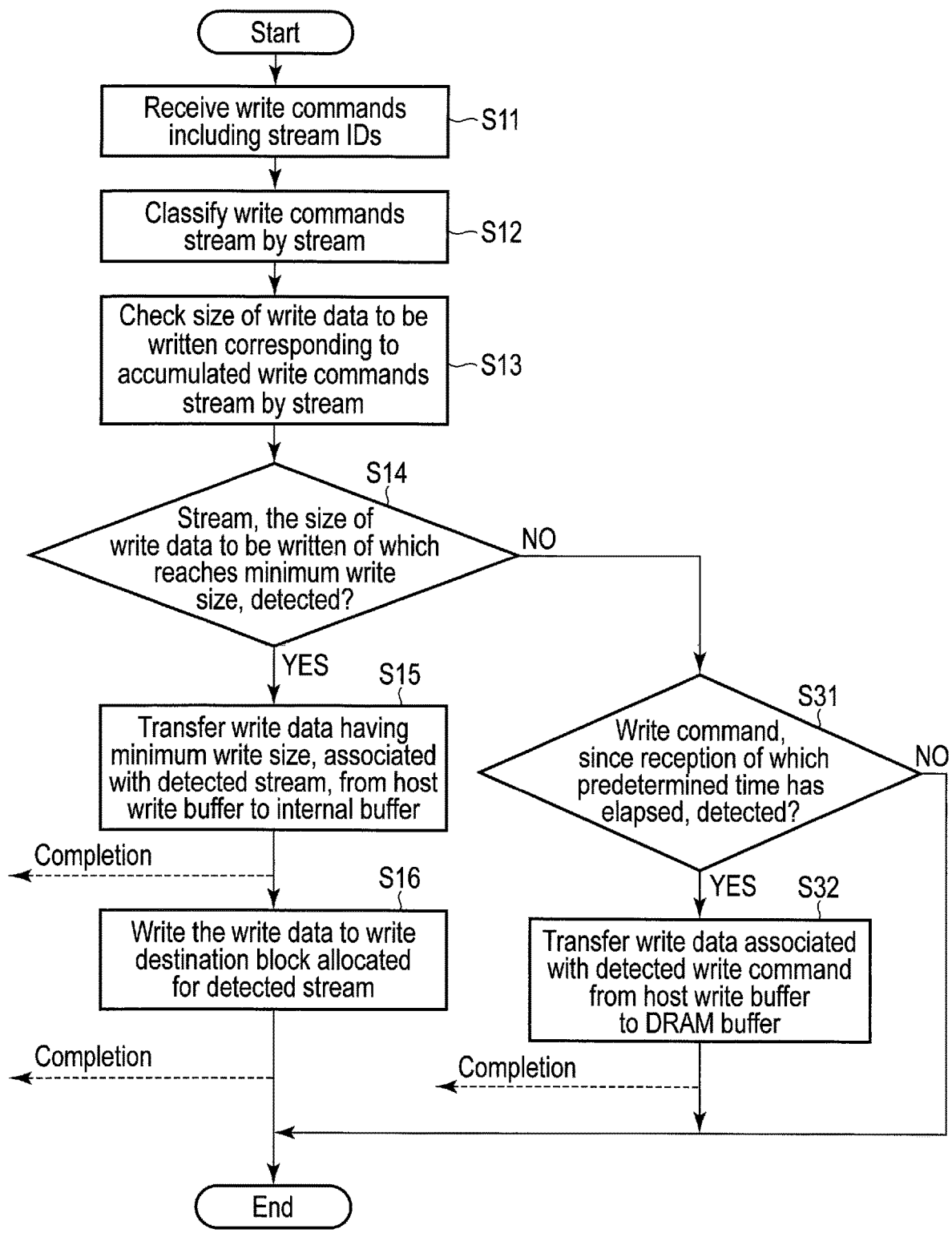
F I G. 14

US 11,662,952 B2

MEMORY SYSTEM AND METHOD OF CONTROLLING NONVOLATILE MEMORY AND FOR REDUCING A BUFFER SIZE

CROSS-REFERENCE TO RELATED APPLICATIONS

This application is a Continuation of U.S. application Ser. No. 16/815,950, filed Mar. 11, 2020, and is based upon and claims the benefit of priority from Japanese Patent Application No. 2019-155832, filed Aug. 28, 2019, the entire contents of which are incorporated herein by reference.

FIELD

Embodiments described herein relate generally to a technique for controlling a nonvolatile memory.

BACKGROUND

In recent years, memory systems comprising nonvolatile memories have been widely prevalent. As one of the memory systems, a solid-state drive (SSD) based on a HAND flash technology has been known.

The SSD has been used as a storage device of various host computing systems, such as a server of a data center.

In some cases, it has been required that a storage device used in a host computing system can write different types of data to different write destination blocks.

BRIEF DESCRIPTION OF THE DRAWINGS

FIG. 1 is a block diagram illustrating the relationship between a host and a memory system according to an embodiment.

FIG. 2 is a block diagram illustrating a configuration example of the memory system according to the embodiment.

FIG. 4 is a diagram illustrating a configuration example of a superblock used in the memory system according to the embodiment.

FIG. 5 is a block diagram illustrating a stream write operation which writes a plurality of types of write data associated with a plurality of streams to a plurality of write destination blocks corresponding to the streams, respectively.

FIG. 8 is a block diagram illustrating a write operation executed in the memory system according to the embodiment.

FIG. 11 is a block diagram illustrating respective configuration examples of the host and the memory system according to the embodiment in relation to data read.

FIG. 14 is a flowchart illustrating another procedure for the write operation executed in the memory system according to the embodiment.

DETAILED DESCRIPTION

Figure 3:
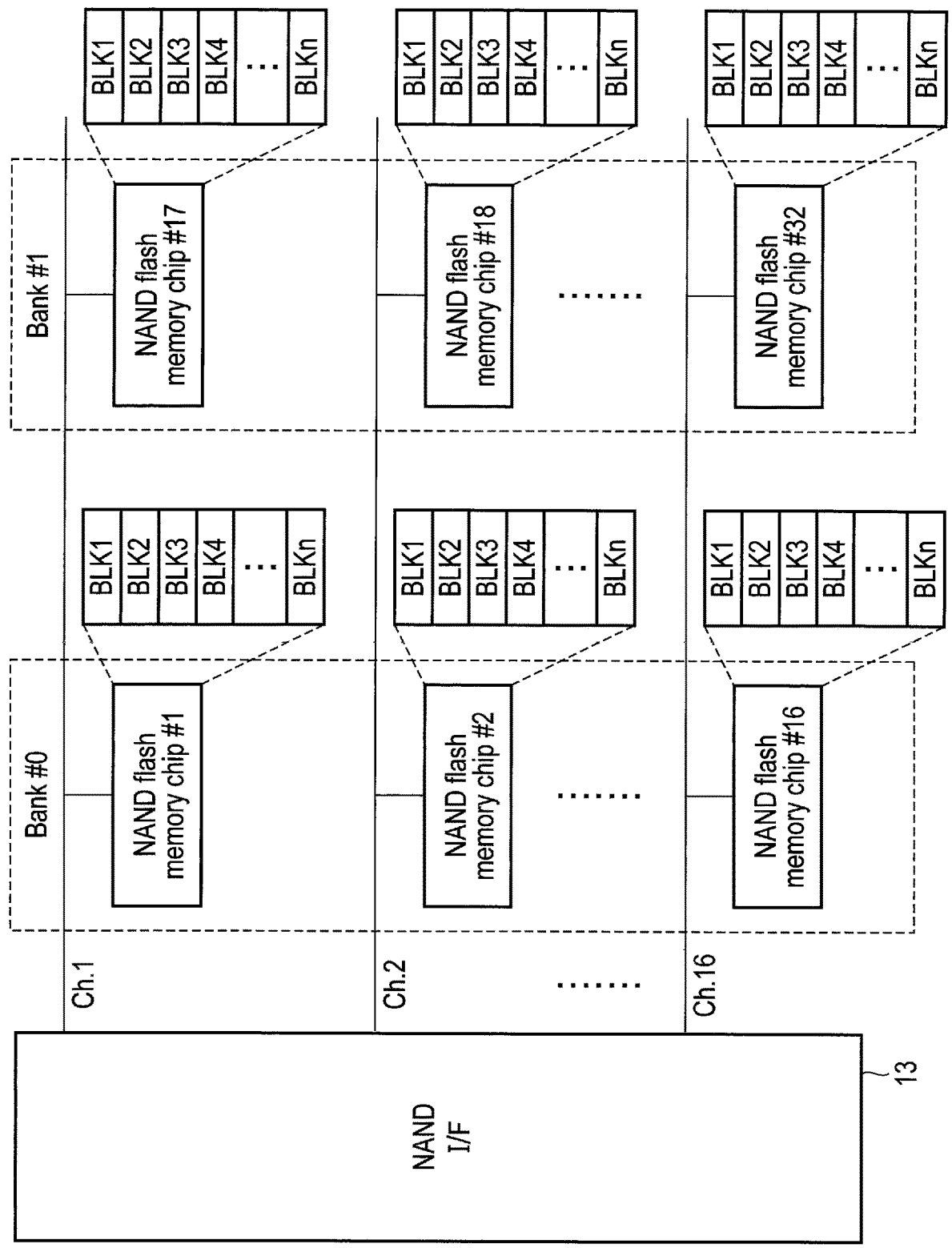
FIG. 3 is a block diagram illustrating the relationship between a plurality of channels and a plurality of NAND flash memory chips used in the memory system according to the embodiment.

Various embodiments will be described hereinafter with reference to the accompanying drawings.

In general, according to one embodiment, a memory system connectable to a host comprises a nonvolatile memory including a plurality of blocks, and a controller electrically connected to the nonvolatile memory and configured to allocate a plurality of write destination blocks corresponding to a plurality of streams from the plurality of blocks.

The controller receives a plurality of write commands from the host, each of the plurality of write commands including a stream identifier indicative of one of the plurality of streams. The controller classifies the received write commands into a plurality of groups corresponding to the plurality of streams. The controller determines, for each of the plurality of groups, whether or not a length of write data associated with a set of write commands belonging to a same group reaches a minimum write size of the nonvolatile memory.

When a length of write data associated with a set of write commands belonging to a first group corresponding to a first stream of the plurality of streams reaches the minimum write size, the controller transfers write data having the minimum write size and associated with the set of write commands belonging to the first group from a write buffer in a memory of the host to a first buffer in the memory system. The controller writes the write data transferred to the first buffer to a first write destination block of the plurality of write destination blocks, the first write destination block corresponding to the first stream.

FIG. 1 is a block diagram showing the relationship between a host and a memory system according to an embodiment.

The memory system is a semiconductor storage device configured to write data to a nonvolatile memory and to read data from the nonvolatile memory. The memory system is realized as a solid-state drive (SSD) 3 based on a NAND flash technology.

The host (host device) 2 is configured to control a plurality of SSDs 3. The host 2 is realized as an information processing apparatus configured to use a flash array including the SSDs 3 as storage. The information processing apparatus may be a personal computer or a server computer.

The SSD 3 may be used as one of a plurality of storage devices provided in a storage array. The storage array may be connected to an information processing apparatus such as a server computer via a cable or a network. The storage array includes a controller which controls a plurality of storages (e.g., a plurality of SSDs 3) in the storage array. When the SSDs 3 are applied to the storage array, the controller of the storage array may function as a host of the SSDs 3.

Hereinafter, a case where an information processing apparatus such as a server computer functions as a host 2 will be described as an example.

The host (i.e., server) 2 and the SSDs 3 are interconnected via an interface 50 (i.e., internal interconnection). As the interface 50 for interconnection, PCI Express (PCIe) (registered trademark), NVM Express (NVMe) (registered trademark), Ethernet (registered trademark), NVMe over Fabrics (NVMeOF), etc., can be used. However, the interface 50 is not limited to these examples.

A typical example of the server computer functioning as the host 2 is a server computer (hereinafter, referred to as a server) in a data center.

When the host 2 is realized as the server in the data center, the host (i.e., server) 2 may be connected to a plurality of end user terminals (i.e., clients) 61 via a network 60. The host 2 can provide various services for the end user terminals 61.

Examples of the services that can be provided by the host (i.e., server) 2 are (1) Platform as a Service (PaaS), which provides a system running platform for each client (i.e., each end user terminal 61), (2) Infrastructure as a Service (IaaS), which provides an infrastructure such as a virtual server for each client (i.e., each end user terminal 61), etc.

A plurality of virtual machines may be executed on a physical server which functions as the host (i.e., server) 2. Each of the virtual machines running on the host (i.e., server) 2 can function as a virtual server configured to provide various services for clients (i.e., end user terminals 61) corresponding to the virtual machines. In each of the virtual machines, an operating system and a user application used by a corresponding one of the end user terminals 61 are executed. An operating system corresponding to each of the virtual machines includes an I/O service. The I/O service may be a block I/O service based on a logical block address (LBA) or a key-value store service.

In the operating system corresponding to each of the virtual machines, the I/O service issues an I/O command (i.e., a write command or a read command) in response to a write/read request from the user application. The I/O command is input to a submission queue in the host 2, and sent to the SSD 3 via the submission queue.

The SSD 3 includes a nonvolatile memory such as a NAND flash memory. The SSD 3 supports a stream write operation of writing a plurality of types of write data associated with different streams to different blocks, respectively. The SSD 3 allocates a plurality of write destination blocks corresponding to the streams from a plurality of blocks included in the nonvolatile memory. The write destination blocks mean blocks to which data is to be written.

Each write command sent from the host 2 to the SSD 3 includes a stream identifier (i.e., stream ID) indicative of one of the streams. When the SSD 3 receives a write command including a stream ID of a stream from the host 2, the SSD 3 writes write data associated with the write command to a write destination block corresponding to the stream. When the SSD 3 receives a write command including a stream ID of another stream from the host 2, the SSD 3 writes write data associated with the write command to another write destination block corresponding to the other stream. When the whole write destination block corresponding to a stream is filled with data, a new write destination block for the stream is allocated.

Accordingly, the host 2 issues write commands each including a stream ID to the SSD 3, and thereby can realize data arrangement, for example, in such a way that a group of specific data, such as data of a user application corresponding to an end user terminal 61 (i.e., client), is written to one or more specific blocks, and another group of specific data, such as data of a user application corresponding to another end user terminal 61 (i.e., client), is written to another one or more blocks.

FIG. 2 illustrates a configuration example of the SSD 3.

The SSD 3 comprises a controller 4 and a nonvolatile memory (e.g., NAND flash memory) 5. The SSD 3 may also comprise a random access memory, for example, a DRAM 6.

The NAND flash memory 5 includes a memory cell array including a plurality of memory cells arranged in a matrix. The NAND flash memory 5 may be a NAND flash memory of a two-dimensional structure or a NAND flash memory of a three-dimensional structure.

The memory cell array of the NAND flash memory 5 includes a plurality of blocks BLK0 to BLKm-1. Each of the blocks BLK0 to BLKm-1 includes a plurality of pages (in this case, pages P0 to Pn-1). The blocks BLK0 to BLKm-1 function as erase units. Blocks may also be referred to as "erase blocks", "physical blocks", or "physical erase blocks". The pages P0 to Pn-1 are units of a data write operation and a data read operation.

The controller 4 is electrically connected to the NAND flash memory 5, which is a nonvolatile memory, via a NAND interface 13, such as a Toggle NAND flash interface or an open NAND flash interface (ONFI). The controller 4 operates as a memory controller configured to control the NAND flash memory 5. The controller 4 may be realized as a circuit such as a system-on-a-chip (SoC).

As illustrated in FIG. 3, the NAND flash memory 5 may include a plurality of NAND flash memory chips (i.e., NAND flash memory dies). Each of the NAND flash memory chips can operate independently. Thus, the NAND flash memory chips function as units of possible parallel operations. In FIG. 3, a case where sixteen channels Ch.1 to Ch.16 are connected to the NAND interface 13, and two NAND flash memory chips are connected to each of the sixteen channels Ch.1 to Ch.16 is shown as an example. In this case, sixteen NAND flash memory chips #1 to 416 connected to the channels Ch.1 to Ch.16 may be organized into a bank #0, and the other sixteen NAND flash memory chips #17 to #32 connected to the channels Ch.1 to Ch.16 may be organized into a bank #1. The banks function as units for causing a plurality of memory modules to operate in parallel by bank interleaving. In the configuration example of FIG. 3, a maximum of thirty-two NAND flash memory chips can operate in parallel by sixteen channels and bank interleaving of two banks.

An erase operation may be executed in units of one block (i.e., physical block) or in units of a parallel unit (i.e., superblock) including a set of physical blocks for which parallel operations are possible. One parallel unit, that is, one superblock including a set of physical blocks, may include a total of thirty-two physical blocks selected from the NAND flash memory chips #1 to #32, respectively. However, the parallel unit is not limited to this example. Each of the NAND flash memory chips #1 to #32 may have a multiplane structure. For example, when each of the NAND flash memory chips #1 to #32 has a multiplane structure including two planes, each superblock may include a total of sixty-four physical blocks selected from sixty-four planes corresponding to the NAND flash memory chips #1 to #32, respectively.

In FIG. 4, one superblock (SB) including thirty-two physical blocks (in this case, the physical block BLK2 in the NAND flash memory chip #1, the physical block BLK3 in the NAND flash memory chip #2, the physical block BLK7 in the NAND flash memory chip #3, the physical block BLK4 in the NAND flash memory chip #4, the physical block BLK6 in the NAND flash memory chip #5, . . . , the physical block BLK3 in the NAND flash memory chip #32) is shown as an example.

A write destination block may be one physical block or one superblock. The structure wherein each superblock includes only one physical block may be adopted. In this case, each superblock is equivalent to one physical block.

Next, the configuration of the controller 4 of FIG. 2 will be described.

The controller 4 can function as a flash translation layer (FTL) configured to perform data management and block management of the NAND flash memory 5. The data management performed by the FTL includes (1) management of mapping information indicative of the correspondences between logical addresses and physical addresses of the NAND flash memory 5, (2) processing for concealing restrictions of the NAND flash memory 5 (e.g., a read/write operation in units of pages and an erase operation in units of blocks), etc. The logical addresses are addresses used by the host 2 in order to specify addresses of locations in a logical address space of the SSD 3. As the logical addresses, logical block addresses (addressing) (LBAs) can be used.

The mapping between the logical addresses used by the host 2 to access the SSD 3 and the physical addresses of the NAND flash memory 5 is managed using an address translation table (i.e., logical-to-physical address translation table: L2P table) 31. The controller 4 manages the mapping between the logical addresses and the physical addresses in units of predetermined management sizes, using the L2P table 31. A physical address corresponding to a logical address is indicative of the latest physical storage location in the NAND flash memory 5 in which data corresponding to the logical address is written. The L2P table 31 may be loaded from the NAND flash memory 5 into the DRAM 6 when the SSD 3 is powered on.

In the NAND flash memory 5, data can be written to a page only once per erase cycle. That is, an area in a block in which data already has been written cannot be directly overwritten with new data. Thus, in order to update the already written data, the controller 4 writes new data to an unwritten area in the block (or another block), and handles the previous data as invalid data. In other words, the controller 4 writes update data corresponding to a logical address, not to a physical storage location in which previous data corresponding to the logical address is stored, but to another physical storage location. Then, the controller 4 updates the L2P table 31 to associate the logical address with the other physical storage location, and invalidates the previous data. In the present embodiment, the L2P table 31 may be updated after data to be written (i.e., write data) is written to the NAND flash memory 5, after write data is transferred from the host 2, or after a write command is received from the host 2.

The block management includes management of defective blocks, wear leveling, garbage collection (GC), etc. The wear leveling is an operation for leveling the respective numbers of rewrite operations (i.e., the numbers of program/erase cycles) for blocks.

The GC is an operation for increasing the number of free blocks. The free blocks mean blocks including no valid data. In the GC, the controller 4 copies valid data in several blocks including both the valid data and invalid data to another block (e.g., a free block). In this case, the valid data mean data associated with logical addresses. For example, data referred to from the L2P table 31 (i.e., data linked to logical addresses as the latest data) are valid data, and may be read by the host 2 later. The invalid data mean data not associated with any logical addresses. The data not associated with any logical addresses are data which will not be read by the host 2 anymore. Then, the controller 4 updates the L2P table 31, and maps the respective logical addresses of the copied valid data to copy destination physical addresses. The blocks which include only the invalid data after the valid data have been copied to the other block are released as free blocks. These blocks thereby become available after an erase operation is executed for these blocks.

The controller 4 includes a host interface 11, a CPU 12-1, a CPU 12-2, the NAND interface 13, the DRAM interface 14, a direct memory access controller (DMAC) 15, an internal buffer 16, an ECC encode/decode unit 17, etc. The host interface 11, the CPU 12-1, the CPU 12-2, the NAND interface 13, the DRAM interface 14, the direct memory access controller (DMAC) 15, the internal buffer 16, and the ECC encode/decode unit 17 are interconnected via a bus 10.

The host interface 11 is a host interface circuit configured to perform communication with the host 2. The host interface 11 may be, for example, a PCIe controller (e.g., NVMe controller). Alternatively, in the structure wherein the SSD 3 is connected to the host 2 via Ethernet (registered trademark), the host interface 11 may be an NVMe over Fabrics (NVMeOF) controller.

The host interface 11 receives various commands from the host 2. These commands include a write command, a read command, a deallocation command (i.e., unmap/trim command), and other various commands.

The write command is a command to write data to be written (i.e., write data) to the NAND flash memory 5 (i.e., write request), and includes a logical address (i.e., starting LBA) of write data, the length of the write data, a stream identifier (i.e., stream ID) indicative of a stream with which the write data is associated, a data pointer indicative of a location in a write buffer in a memory of the host 2 in which the write data is stored, etc.

The read command is a command to read data from the NAND flash memory 5 (i.e., read request), and includes a logical address (i.e., starting LBA) of data to be read, the length of the data, a data pointer indicative of a location in a read buffer in the memory of the host 2 to which the data is to be transferred, etc.

The deallocation command (i.e., unmap/trim command) is a command to invalidate data corresponding to a logical address. The deallocation command (i.e., unmap/trim command) specifies a logical address range (LBA range) to be invalidated.

Each of the CPUs 12-1 and 12-2 is a processor configured to control the host interface 11, the NAND interface 13, and the DRAM interface 14. Each of the CPUs 12-1 and 12-2 executes various processes by loading a control program (i.e., firmware) from the NAND flash memory 5 or a ROM not illustrated in the figures to the DRAM 6 in response to the power-on of the SSD 3 and executing the firmware. The firmware may be loaded into an SRAM not illustrated in the figures in the controller 4. Each of the CPUs 12-1 and 12-2 can execute a command process for processing various commands from the host 2, etc. The operation of each of the CPUs 12-1 and 12-2 is controlled by the above firmware. Part or all of the command process may be executed by dedicated hardware in the controller 4. A command process for one command includes a plurality of processes. The execution of the processes may be shared by the CPUs 12-1 and 12-2, or the processes may be executed only one of the CPUs 12-1 and 12-2.

At least one of the CPUs 12-1 and 12-2 can function as a write control unit 21 and a read control unit 22. Part or all of each of the write control unit 21 and the read control unit 22 also may be realized by dedicated hardware in the controller 4.

The write control unit 21 executes, in response to a write command received from the host 2, a process for writing write data associated with the write command to the NAND flash memory 5. The write control unit 21 supports the above stream write operation. The write control unit 21 allocates a plurality of write destination blocks corresponding to a plurality of streams from a plurality of blocks of the NAND flash memory 5, and manages the allocated write destination blocks.

In some NAND flash memories, data written in one page of a plurality of pages in a block becomes readable after data is written to one or more pages subsequent to the page in order to reduce program disturbance. The timing at which data in each page becomes readable varies according to write methods applied to the NAND flash memories.

For example, in a triple-level cell (TLC) flash memory in which 3-bit data can be stored per memory cell, a lower page, a middle page, and an upper page are allocated to a group of memory cells connected to a word line WL0, a lower page, a middle page, and an upper page are allocated to a group of memory cells connected to the next word line WL1, a lower page, a middle page, and an upper page are allocated to a group of memory cells connected to a word line WL2 next to the word line WL1, a lower page, a middle page, and an upper page are allocated to a group of memory cells connected to a word line WL3 next to the word line WL2, and a lower page, a middle page, and an upper page are allocated to a group of memory cells connected to the last word line WLn. In memory cells connected to each word line, data cannot be correctly read from each of a lower page and a middle page until a write operation for an upper page is complete.

In addition, in a NAND flash memory, the page write order indicative of the order of pages necessary to write data to each block is defined. For example, in a TLC flash memory, in order to suppress the influence of program disturbance, the page write order is determined such that a write operation is executed for adjacent several word lines alternately.

For example, the write operation is executed in the write order of a write to the lower page of the word line WL0, a write to the lower page of the word line WL1, a write to the middle page of the word line WL0, a write to the lower page of the word line WL2, a write to the middle page of the word line WL1, a write to the upper page of the word line WL0, a write to the lower page of the word line WL3, a write to the middle page of the word line WL2, and a write to the upper page of the word line WL1. Thus, data written in one page of a plurality of pages in a block becomes readable after data is written to several pages subsequent to the page.

The write control unit 21 receives write commands from the host 2, and executes the write operation of writing write data associated with each write command to the NAND flash memory 5. The write operation includes: (1) the address allocation operation of allocating, to write data, a physical address indicative of a storage location in the NAND flash memory 5 to which the write data is to be written; (2) the data transfer operation of transferring the write data from the write buffer in the memory of the host 2; (3) the flash write operation (i.e., program operation) of writing the write data transferred from the write buffer in the memory of the host 2 to a write destination block; (4) the L2P update operation of updating the L2P table 31 such that a physical address allocated co the write data is associated with a logical address of the write data; etc.

In the present embodiment, as described above, the write control unit 21 supports the stream write operation of writing write data associated with different streams to different write destination blocks, respectively. Since each write command received from the host 2 includes a stream ID, the write control unit 21 can identify a stream associated with write data corresponding to each write command.

In a host computing system such as a server in a data center, the realization of an SSD in which a large number of streams can be used may be desired in order to support a large number of end users.

However, when the structure wherein write data is transferred from the host 2 to a buffer in the SSD 3 whenever a write command is received from the host 2 is adopted, it is necessary to prepare a large-capacity buffer in the SSD, and the cost of the SSD 3 thereby increases. In addition, when the structure wherein a large-capacity buffer is allocated to a storage area of the DRAM 6 is adopted, traffic between the controller 4 and the DRAM 6 increases because of data transfer of write data, and the speed of access to the L2P table 31 in the DRAM 6 thereby declines, so that the performance of the SSD 3 declines.

In the present embodiment, the write control unit 21 executes the following stream write operation in order that a necessary buffer size can be reduced:

The write control unit 21 receives write commands from the host 2. Each of the write commands includes a stream ID. The write control unit 21 classifies the received write commands into a plurality of groups (i.e., write command groups) corresponding to a plurality of streams. Then, the write control unit 21 determines, for each of the groups, whether or not the length of write data associated with a set of write commands belonging to the same group reaches a minimum write size of the NAND flash memory 5.

The minimum write size of the NAND flash memory 5 may be a page size, that is, the size of one page (e.g., 16 Kbytes). Alternatively, when a NAND flash memory chip including two planes is used as the NAND flash memory 5, write operations for two blocks selected from the two planes may be executed in parallel. In this case, twice the page size (e.g., 32 Kbytes) may be used as the minimum write size of the NAND flash memory 5.

The minimum length of write data specified by each write command is, for example, 4 Kbytes (or 512 bytes). Thus, the minimum write size of the NAND flash memory 5 is greater than the minimum size of write data specified by each write command.

When the length of the write data associated with the set of write commands belonging to the same group does not reach the minimum write size, the write control unit 21 does not execute a process of acquiring the write data associated with the set of write commands belonging to the group from the write buffer in the memory of the host 2, and waits for the length of the write data associated with the set of write commands belonging to the group to reach the minimum write size. This intends to prevent an area in the buffer in the SSD 3 from being occupied in a long time by write data which cannot start being written to the NAND flash memory 5.

When new write commands belonging to the group is received from the host 2 and the length of write data associated with the set of write commands belonging to the group thereby reaches the minimum write size, the write control unit 21 transfers the write data having the minimum write size, which is associated with the set of write commands belonging to the group, from the write buffer in the memory of the host 2 to the internal buffer 16. The internal buffer 16 may be realized by, for example, the SRAM in the controller 4. The internal buffer 16 is also referred to as a first buffer. Then, the write control unit 21 writes the write data transferred to the internal buffer 16 to a write destination block allocated for a stream corresponding to the group. In this case, generally, the write data is encoded, and the encoded write data (e.g., the write data and an error correction code [ECC]) is written to the write destination block. After the write of the write data to the write destination block is complete, the write control unit 21 returns responses indicative of the completions of the write commands belonging to the group to the host 2. Alternatively, the write control unit 21 may return responses indicative of the completions of the write commands belonging to the group to the host 2, after the process of transferring the write data associated with the set of write commands belonging to the group to the internal buffer 16 is complete.

When the write data is written to the write destination block, the storage area in the internal buffer 16 immediately becomes releasable. Thus, the internal buffer 16 becomes available for the transfer of write data having the minimum write size and corresponding to another stream. Accordingly, since substantially the same size as the minimum write size is sufficient as the size of the internal buffer 16, a large number of streams can be used at the same time without preparing a large-capacity buffer.

In addition, since the traffic between the controller 4 and the DRAM 6 does not increase because of data transfer of the write data, a decline in the speed of access to the L2P table 31 and a decline in the performance of the SSD 3 as a whole can be suppressed.

There is also a case where a length specified by one received write command is equal to the minimum write size. In this case, after the write command is received, write data associated with the write command is transferred from the write buffer in the memory of the host 2 to the internal buffer 16.

Moreover, there is also a case where a length specified by one received write command is greater than the minimum write size. In this case, after the write command is received, only a data portion having the minimum write size of write data associated with the write command is transferred from the write buffer in the memory of the host 2 to the internal buffer 16. Then, the transfer of the other portion of the write data from the write buffer in the memory of the host 2 to the internal buffer 16 is performed after the total length of the length of the other portion and the length of write data of one or more subsequent write commands including the same stream ID as that of the write command reaches the minimum write size.

The read control unit 22 receives a read command from the host 2, and reads data specified by the received read command from the NAND flash memory 5, a second buffer in the SSD 3, or the write buffer in the memory of the host 2. As the second buffer in the SSD 3, a buffer 32 in the DRAM 6 can be used. The second buffer (i.e., the buffer 32 in the DRAM 6) is used, for example, to store write data associated with a write command, since the reception of which a predetermined time has elapsed. That is, when the predetermined time has elapsed since the reception of a write command belonging to a group corresponding to a stream, even when the length of write data associated with a set of write commands belonging to the group corresponding to the stream does not reach the minimum write size, the write control unit 21 transfers only write data associated with the write command, since the reception of which the predetermined time has elapsed, from the write buffer in the memory of the host 2 to the buffer 32 in the DRAM 6 as write data for the stream, and returns a response indicative of the completion of the write command to the host 2. A timeout error of the write command thereby can be prevented from occurring.

When data specified by a read command is data readable from the NAND flash memory 5, the read control unit 22 reads the data from the NAND flash memory 5 and returns the read data to the host 2.

Data specified by a read command may not be data readable from the NAND flash memory 5. For example, when the write of data specified by a read command to the NAND flash memory 5 has not been started, the data is not data readable from the NAND flash memory 5. In addition, when data has been written in the NAND flash memory 5 but has not become readable yet, the data is not data readable from the NAND flash memory 5 either.

When data specified by a read command is not data readable from the NAND flash memory 5 and the data exists in the buffer 32 in the DRAM 6, the read control unit 22 reads the data from the buffer 32 and returns the read data to the host 2. When the data does not exist in the buffer 32 in the DRAM 6, the read control unit 22 first acquires the data from the write buffer in the memory of the host 2 and returns the acquired data to the host 2.

The NAND interface 13 is a memory control circuit configured to control the WAND flash memory 5 under the control of the CPU 12-1 or the CPU 12-2.

The DRAM interface 14 is a DRAM control circuit configured to control the DRAM 6 under the control of the CPU 12-1 or the CPU 12-2. A part of the storage area of the DRAM 6 may also be used as a storage area for the L2P table 31 and the buffer 32. In addition, another part of the storage area of the DRAM 6 may also be used to store a block management table 33 and a write destination block management table 34.

The DMAC 15 performs data transfer between the memory of the host 2 and the internal buffer 16 under the control of the CPU 12-1 or the CPU 12-2. When write data is to be transferred from the write buffer in the memory of the host 2 to the internal buffer 16, the CPU 12-1 or the CPU 12-2 specifies, for the DMAC 15, a transfer source address indicative of a location in the write buffer in the memory of the host 2, a data size, and a transfer destination address indicative of a location in the internal buffer 16.

When data is to be written to the NAND flash memory 5, the CCC encode/decode unit 17 encodes the data (i.e., data to be written) (ECC encoding), and thereby adds an error correction code (ECC) co the data as a redundant code. When data is read from the NAND flash memory 5, the ECC encode/decode unit 17 performs error correction of the data, using an ECC added to the read data (ECC decoding).

FIG. 5 illustrates the stream write operation of writing a plurality of types of write data associated with a plurality of streams to a plurality of write destination blocks corresponding to a plurality of streams, respectively.

In FIG. 5, a case where a stream of a stream ID #1 is associated with a write destination block BLK10, a stream of a stream ID #2 is associated with a write destination block BLK20, a stream of a stream ID #3 is associated with a write destination block BLK30, a stream of a stream ID #4 is associated with a write destination block BLK40, a stream of a stream ID #5 is associated with a write destination block BLK50, a stream of a stream ID #6 is associated with a write destination block BLK60, and a stream of a stream ID #n is associated with a write destination block BLK100 is shown as an example.

For example, an I/O service (i.e., virtual machine #1) corresponding to an end user #1 issues write commands each including the stream ID #1, an I/O service (i.e., virtual machine #2) corresponding to an end user #2 issues write commands each including the stream ID #2, and an I/O service (i.e., virtual machine #n) corresponding to an end user #n issues write commands each including the stream ID #n.

Write data associated with the write commands including the stream ID #1 are written to the write destination block BLK10, write data associated with the write commands including the stream ID #2 are written to the write destination block BLK20, and write data associated with the write commands including the stream ID #n are written to the write destination block BLK100.

Figure 6:
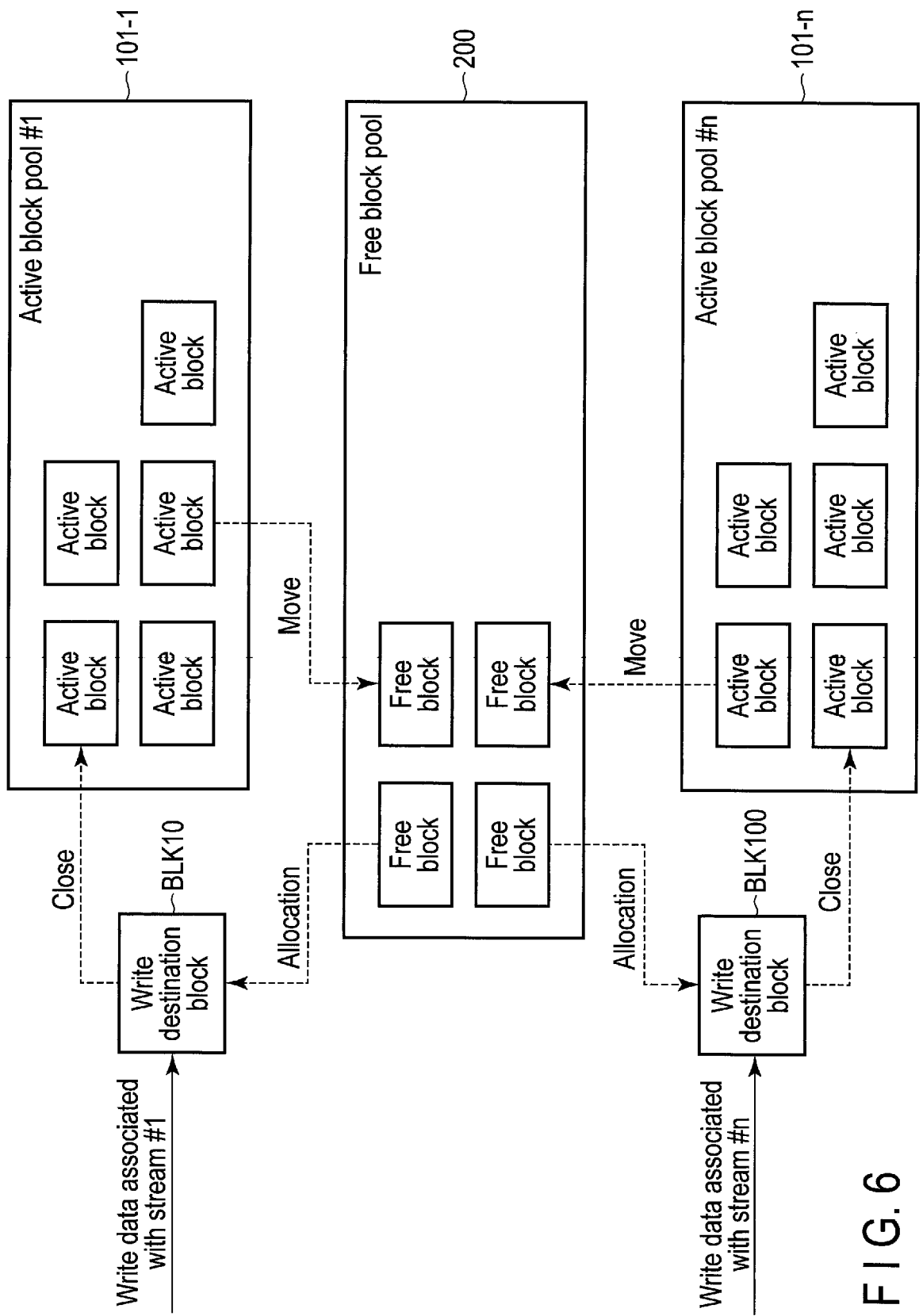
FIG. 6 is a block diagram illustrating an operation of allocating the write destination blocks corresponding to the streams from a group of free blocks.

FIG. 6 illustrates the operation of allocating a plurality of write destination blocks corresponding to a plurality of streams from a group of free blocks.

In FIG. 6, for the sake of simplification, only two streams, that is, the stream (i.e., stream #1) of the stream ID #1 and the stream (i.e., stream #2) of the stream ID #2, are shown as an example.

The state of each block in the NAND flash memory 5 is roughly classified as an active block in which valid data is stored or a free block in which valid data is not stored. Each active block is managed by a list referred to as an active block pool. On the other hand, each free block is managed by a list referred to as a free block pool. An active block pool 101-1 is a list of blocks in which valid data associated with the stream #1 are stored, respectively. An active block pool 101-n is a list of blocks in which valid data associated with the stream #n are stored, respectively, A free block pool 200 is a list of all free blocks. These free blocks are shared by a plurality of streams.

When the controller 4 receives a write command including the stream ID #1, the controller 4 determines whether or not a write destination block (i.e., open block) for the stream #1 has already been allocated.

When the write destination block for the stream #1 has not already been allocated, the controller 4 allocates one free block in the free block pool 200 as the write destination block for the stream #1. In FIG. 6, a case where the block BLK10 is allocated as the write destination block for the stream #1 is shown as an example. The controller 4 writes write data associated with write commands including the stream ID to the block BLK10. When the write destination block for the stream #1 has already been allocated, the controller 4 does not need to execute the operation of allocating a free block as the write destination block for the stream #1.

When the whole write destination block (in this case, the block BLK10) for the stream #1 is filled with write data from the host 2, the controller 4 manages the write destination block BLK10, using the active block pool 101-1 (close), and allocates a free block in the free block pool 200 as a new write destination block (open block) for the stream #1.

When all valid data in a block in the active block pool 101-1 are invalidated by data updating, deallocation (i.e., unmap/trim), garbage collection, etc., the controller 4 moves the block to the free block pool 200 and makes the block transition to the state of being reusable as a write destination block.

When the controller 4 receives a write command including the stream ID #n, the controller 4 determines whether or not a write destination block (i.e., open block) for the stream #n has already been allocated.

When the write destination block for the stream #n has not already been allocated, the controller 4 allocates one free block in the free block pool 200 as the write destination block for the stream #n. In FIG. 6, a case where the block BLK100 is allocated as the write destination block for the stream #n is shown as an example. The controller 4 writes write data associated with write commands including the stream ID #n to the block BLK100. When the write destination block for the stream #n has already been allocated, the controller 4 does not need to execute the operation of allocating a free block as the write destination block for the stream #n.

When the whole write destination block (in this case, the block BLK100) for the stream #n is filled with write data from the host 2, the controller 4 manages the write destination block BLK100, using the active block pool 101-n (close) and allocates a free block in the free block pool 200 as a new write destination block (i.e., open block) for the stream #n.

When all valid data in a block in the active block pool 101-n are invalidated by data updating, deallocation (i.e., unmap/trim), garbage collection, etc., the controller 4 moves the block to the free block pool 200 and makes the block transition to the state of being reusable as a write destination block.

Figure 7:
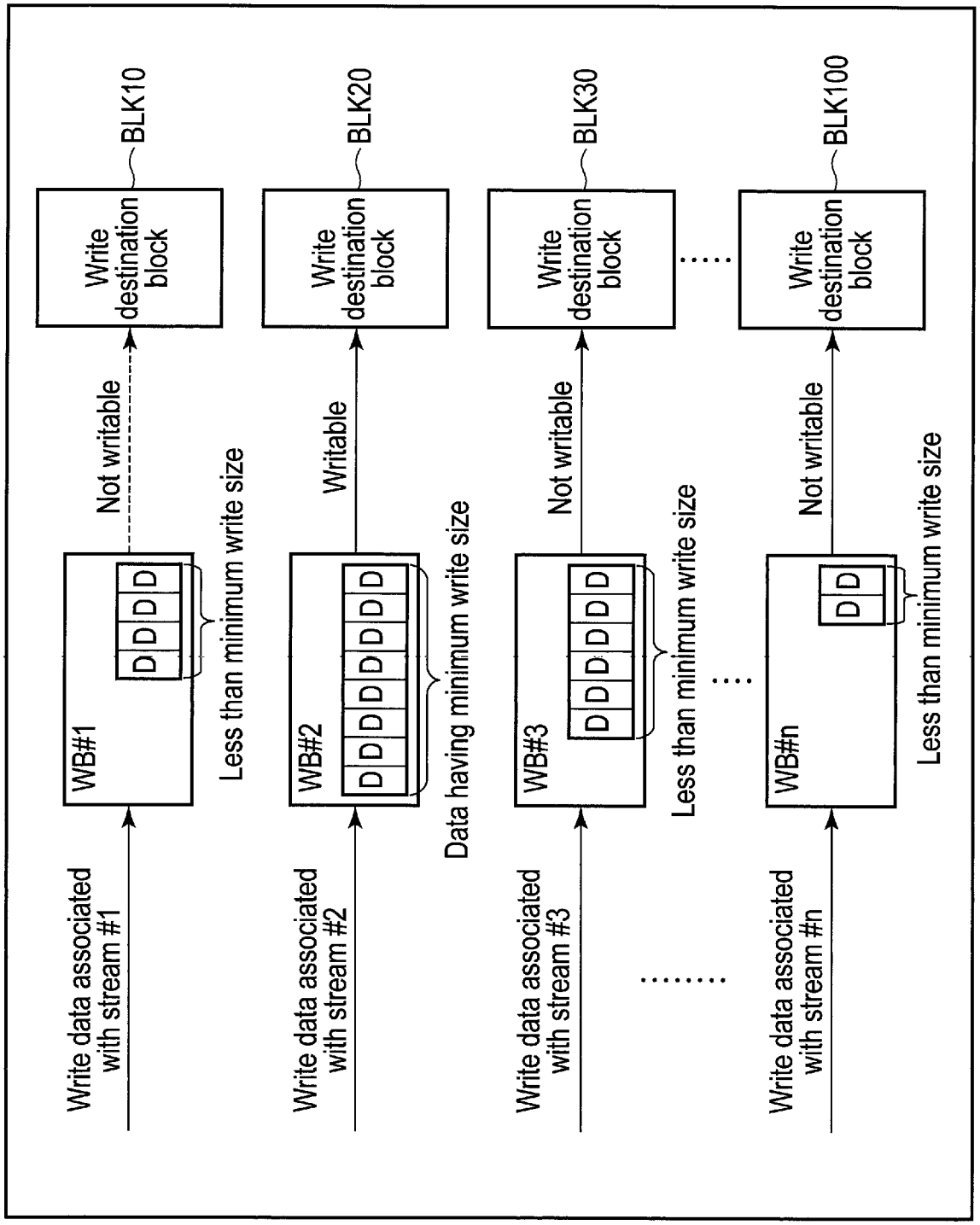
FIG. 7 is a block diagram illustrating a write operation executed using a plurality of buffers corresponding to the streams.

FIG. 7 illustrates a write operation executed using a plurality of buffers corresponding to a plurality of streams.

When the structure wherein write data is transferred from the host 2 to a buffer in the SSD 3 whenever a write command is received from the host 2 is adopted, it is necessary to prepare a write buffer WB #1, a write buffer WB #2, a write buffer WB #3, a write buffer WB #n corresponding to the stream #1, the stream #2, the stream #3, . . . , the stream #n, respectively, in the SSD 3.

Whenever a write command including the stream ID #1 is received, write data associated with the write command is transferred from the write buffer in the memory of the host 2 to the write buffer WB #1. The write data transferred to the write buffer WB #1 needs to be kept in the write buffer WB #1 until the total size of write data accumulated in the write buffer WB #1 reaches the minimum write size of the NAND flash memory 5. When the total size of the write data accumulated in the write buffer WB #1 reaches the minimum write size of the NAND flash memory 5, these write data become writable to the write destination block BLK10 corresponding to the stream #1.

Similarly, whenever a write command including the stream ID #n is received, write data associated with the write command is transferred from the write buffer in the memory of the host 2 to the write buffer WB #n. The write data transferred to the write buffer WB #n needs to be kept in the write buffer WB #n until the total size of write data accumulated in the write buffer WB #n reaches the minimum write size of the NAND flash memory 5. When the total size of the write data accumulated in the write buffer WB #n reaches the minimum write size of the NAND flash memory 5, these write data become writable to the write destination block BLK100 corresponding to the stream #n.

Thus, when there are a large number of streams corresponding to write buffers in which the total size of accumulated write data is less than the minimum write size, a large buffer area will be consumed by write data which cannot start being written to the NAND flash memory 5.

FIG. 8 illustrates a write operation executed in the SSD 3.

The controller 4 of the SSD 3 does not transfer write data from a write buffer 51 in the memory of the host 2 to the internal buffer 16 whenever a write command is received from the host 2, but stores only a write command in a command queue 41 whenever the write command is received from the host 2. That is, the controller 4 classifies the received write commands into n+1 Groups corresponding to the streams #1 to #n by storing each received write command in one of command queues 41-1 to 41-n corresponding to the streams #1 to #n.

In this case, each write command including the stream ID #1 is stored in the command queue 41-1, each write command including the stream ID #2 is stored in the command queue 41-2, each write command including the stream ID #3 is stored in the command queue 41-3, and each write command including the stream ID #n is stored in the command queue 41-n.

The controller 4 calculates the total of lengths (i.e., data size) specified by write commands belonging to the same group, and thereby determines whether or not the length of write data associated with the set of write commands belonging to the same group reaches the minimum write size.

For example, regarding the group corresponding to the stream #1, the controller 4 calculates the total of lengths included in the write commands stored in the command queue 41-1. When the total of the lengths included in the write commands stored in the command queue 41-1 reaches the minimum write size, the controller 4 determines that the length of write data associated with the set of write commands belonging to the group corresponding to the stream #1 reaches the minimum write size.

Similarly, regarding the group corresponding to the stream #2, the controller 4 calculates the total of lengths included in the write commands stored in the command queue 41-2. When the total of the lengths included in the write commands stored in the command queue 41-2 reaches the minimum write size, the controller 4 determines that the length of write data associated with the set of write commands belonging to the group corresponding to the stream #2 reaches the minimum write size.

When the length of write data associated with a set of write commands belonging to a group reaches the minimum write size, for example, when the lengths specified by the write commands belonging to the group corresponding to the stream #2 reach the minimum write size, the controller 4 transfers write data having the minimum write size, associated with the stream #2, from the write buffer 51 in the host memory to the internal buffer 16 on the basis of the data pointers and lengths included in the write commands. Then, the controller 4 writes the write data transferred to the internal buffer 16 to the write destination block BLK20 corresponding to the stream #2. When the write data is written to the write destination block BLK20, the write data in the internal buffer 16 becomes unnecessary.

Thus, for example, when the total of lengths included in the write commands stored in the command queue 41-3 next reaches the minimum write size, the controller 4 can transfer write data having the minimum write size, associated with the set of write commands belonging to the group corresponding to the stream #3 from the write buffer 51 in the host memory to the internal buffer 16, and can write the write data transferred to the internal buffer 16 to the write destination block BLK30 corresponding to the stream #3.

In this manner, in the present embodiment, the controller 4 checks the length (i.e., size) of write data corresponding to a group of received write commands, stream by stream, and detects a stream, the size of write data of which reaches the minimum write size of the NAND flash memory 5. Then, write data having the minimum write size, associated with the stream, the size of write data of which reaches the minimum write size, is transferred from the write buffer 51 in the host memory to the internal buffer 16. The write of the write data having the minimum write size transferred to the internal buffer 16 can be immediately started. Thus, the internal buffer 16 can be shared by a plurality of streams.

Thus, even if the number of streams to be supported by the SSD 3 increases, the SSD 3 can efficiently execute the stream write operation by preparing only the internal buffer 16 having the minimum write size.

Figure 9:
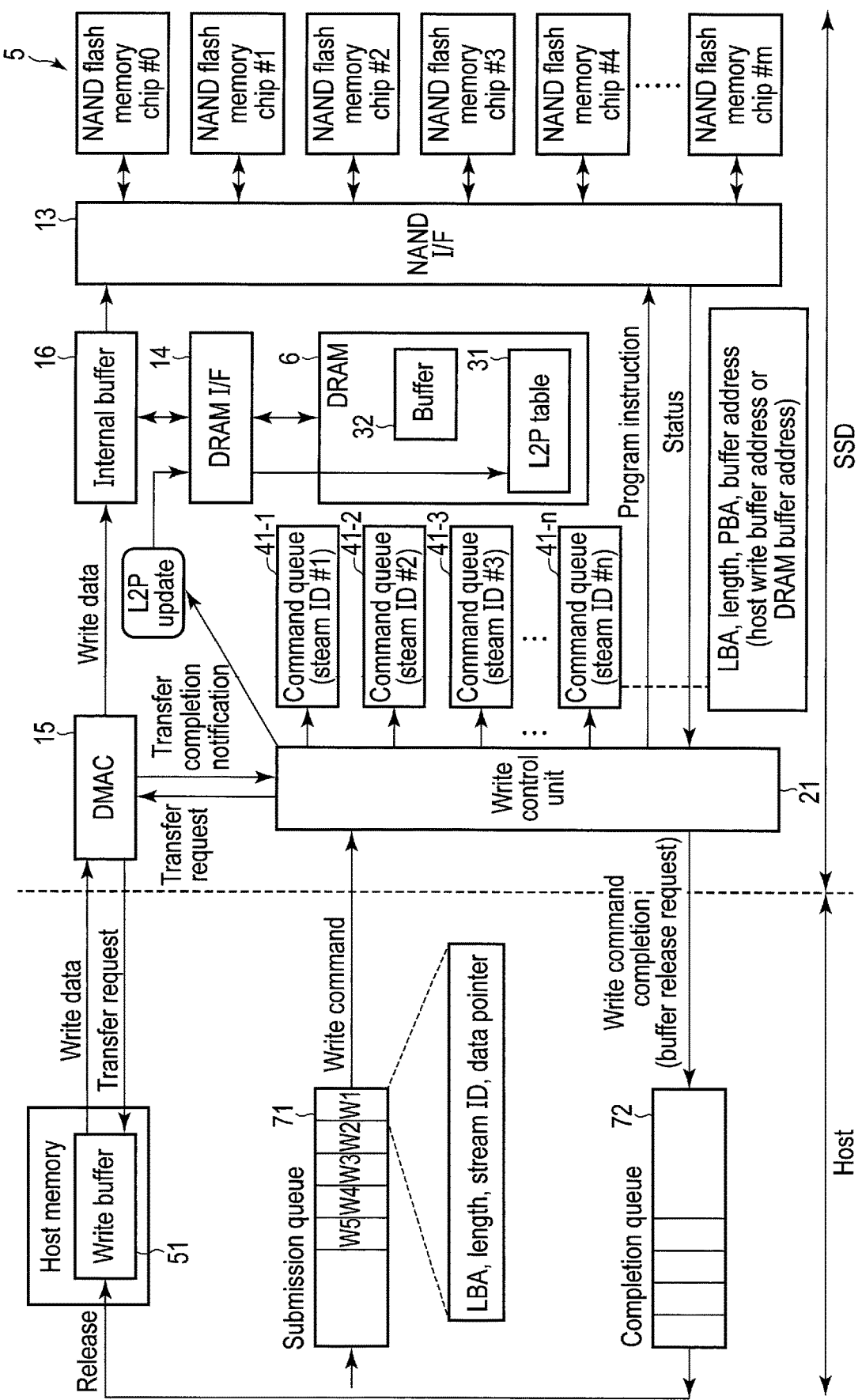
FIG. 9 is a block diagram illustrating respective configuration examples of the host and the memory system according to the embodiment in relation to data write.

FIG. 9 illustrates respective configuration examples of the host 2 and the SSD 3 in relation to data write.

In the host 2, each write command is stored in a submission queue 71. Each write command includes an LBA of write data, the length of write data, a stream ID, and a data pointer indicative of a location in the write buffer 51 in which write data is stored. Each response indicative of the completion of a write command is stored in a completion queue 72.

Write data associated with each write command is stored in the write buffer 51 in the host memory. In the write buffer 51, a plurality of areas corresponding to the stream #1 to the stream #n may be allocated. In this case, write data associated with the stream #1 are stored in the area corresponding to the stream #1 in the write buffer 51, write data associated with the stream #2 are stored in the area corresponding to the stream #2 in the write buffer 51, and write data associated with the stream #n are stored in the area corresponding to the stream #n in the write buffer 51.

In the SSD 3, the write control unit 21 receives write commands from the submission queue 71 of the host 2 and stores each of the received write commands in one of the command queues 41-1 to 41-n, thereby classifying the received write commands into a plurality of groups corresponding to the streams #1 to #n. Each write command including the stream ID #1 is stored in the command queue 41-1, each write command including the stream ID #2 is stored in the command queue 41-2, and each write command including the stream ID #n is stored in the command queue 41-n.

The write control unit 21 executes the address allocation operation of allocating a physical address (PEA) indicative of a storage location in the NAND flash memory 5 to which write data associated with each received write command is to be written, to the write data. The physical address may be represented by a block address, a page address, and an in-page offset. In each command queue, an LBA, a length, a PBA, and a buffer address may be managed for each write command. The PBA is indicative of a physical address (i.e., a block address, a page address, and an in-page offset) allocated to write data associated with a write command. The buffer address is indicative of a location in the write buffer 51 of the host memory in which the write data associated with the write command is stored. The location in the write buffer 51 is specified by a data pointer included in the write command.

When the write data is transferred from the write buffer 51 of the host memory to the buffer 32 of the DRAM 6 (hereinafter, referred to as the DRAM buffer 32), the value of the buffer address is updated to a value indicative of a location in the DRAM buffer 32 in which the write data is stored.

In the DRAM buffer 32, a plurality of areas corresponding to the stream #1 to the stream #n may be allocated. In this case, write data associated with the stream #1 are transferred to the area corresponding to the stream #1 in the DRAM buffer 32, write data associated with the stream #2 are transferred to the area corresponding to the stream #2 in the DRAM buffer 32, and write data associated with the stream #n are transferred to the area corresponding to the stream #n in the DRAM buffer 32.

When the length of write data associated with a set of write commands belonging to a group corresponding to a stream reaches the minimum write size, the write control unit 21 transmits, to the DMAC 15, a transfer request to transfer write data having the minimum write size, associated with the stream, to the internal buffer 16. Upon receipt of the transfer request, the DMAC 15 performs DMA transfer and thereby transfers the write data having the minimum write size, associated with the stream, from the write buffer 51 in the host memory to the internal buffer 16. Then, the write control unit 21 sends a program instruction to the NAND interface 13, and writes the write data having the minimum write size, which has been transferred to the internal buffer 16, to a write destination block in the NAND flash memory 5.

After the transfer of the write data having the minimum write size to the internal buffer 16 is complete, or after the write of the write data having the minimum write size to the write destination block is complete, the write control unit 21 returns responses indicative of the completions of write commands corresponding to the write data (i.e., each write command belonging to the group corresponding to the stream) to the host 2. Each response indicative of the completion of write command is input to the completion queue 72 as a buffer release request to allow the host 2 to release the corresponding write data. Since a response indicative of completion includes an identifier of a write command which has been complete, the host 2 can release an area in the write buffer 51 in which write data associated with the write command specified by the response is stored.

In addition, after the transfer of write data having the minimum write size to the internal buffer 16 is complete, the write control unit 21 may delete each write command corresponding to the write data from a command queue.

Moreover, as described above, when a predetermined time has elapsed since the reception of a write command belonging to a group corresponding to a stream, even when the length of write data associated with a set of write commands belonging to the group corresponding to the stream does not reach the minimum write size, the write control unit 21 transfers only write data associated with the write command from the write buffer 51 in the host memory to the DRAM buffer 32 as write data for the stream, using the DMAC 15, and returns a response indicative of the completion of the write command co the host 2.

For example, when a predetermined time has elapsed since the reception of a write command including the stream ID #1 but the sire of write data associated with a set of write commands stored in the command queue 41-1 does not reach the minimum write size, that is, when the time during which the write command is kept in the command queue 41-1 reaches the predetermined time, the write control unit 21 transfers only write data associated with the write command from the write buffer 51 in the host memory to the DRAM buffer 32 in order to prevent a timeout error of the write command from occurring. In this case, the write data may be transferred to the area for the stream #1 in the DRAM buffer 32. The write command is deleted from the command queue 41-1.

In the period during which the host 2 requests that a large amount of data be written, that is, the period during which the number of write commands of each stream received from the host 2 is relatively large, there is a high possibility that the length of write data associated with a set of write commands belonging to the group corresponding to each stream reaches the minimum write size before a predetermined time has elapsed since the reception of a write command. Thus, most of write data are transferred, not to the DRAM buffer 32, but to the internal buffer 16. A case where the time during which a write command is kept in a command queue reaches a predetermined time occurs when the number of write commands received from the host 2 is relatively small.

Accordingly, the traffic between the controller 4 and the DRAM 6 does not increase because of the transfer of write data. Thus, the bandwidth between the controller 4 and the DRAM 6 can be mainly used for the process of updating the 120 table 31, and the process of updating the 120 table 31 can be efficiently executed.

In addition, when a predetermined time has elapsed since the reception of a write command belonging to a group corresponding to a stream, even when the length of write data associated with a set of write commands belonging to the group corresponding to the stream does not reach the minimum write size, the write control unit 21 may transfer the whole write data associated with the set of write commands from the write buffer 51 in the host memory to the internal buffer 16.

For example, when a predetermined time has elapsed since the reception of a write command including the stream ID #1 but the size of write data associated with a set of write commands stored in the command queue 41-1 does not reach the minimum write size, that is, when the time during which the write command is kept in the command queue 41-1 reaches the predetermined time, the write control unit 21 transfers the write data associated with the set of write commands currently stored in the command queue 41-1 from the write buffer 51 in the host memory to the internal buffer 16 in order to prevent a timeout error of the write command from occurring. In this case, the write control unit 21 generates write data having the minimum write size by adding padding to the write data transferred to the internal buffer 16, and writes the generated write data to a write destination block corresponding to the stream. In this case, dummy data having a specific bit pattern may be added to the write data as padding.

In this manner, when a predetermined time has elapsed since the reception of a write command belonging to a group corresponding to a stream, even when the length of write data associated with a set of write commands belonging to the group does not reach the minimum write size, the write control unit 21 transfers the write data associated with the set of write commands belonging to the group from the write buffer 51 in the host memory to the internal buffer 16, and writes write data having the minimum write size, which is Generated by adding padding to the write data transferred to the internal buffer 16, to a write destination block corresponding to the stream. A timeout error thereby can be prevented from occurring also in the structure wherein the buffer 32 in the DRAM 6 not used.

Figure 10:
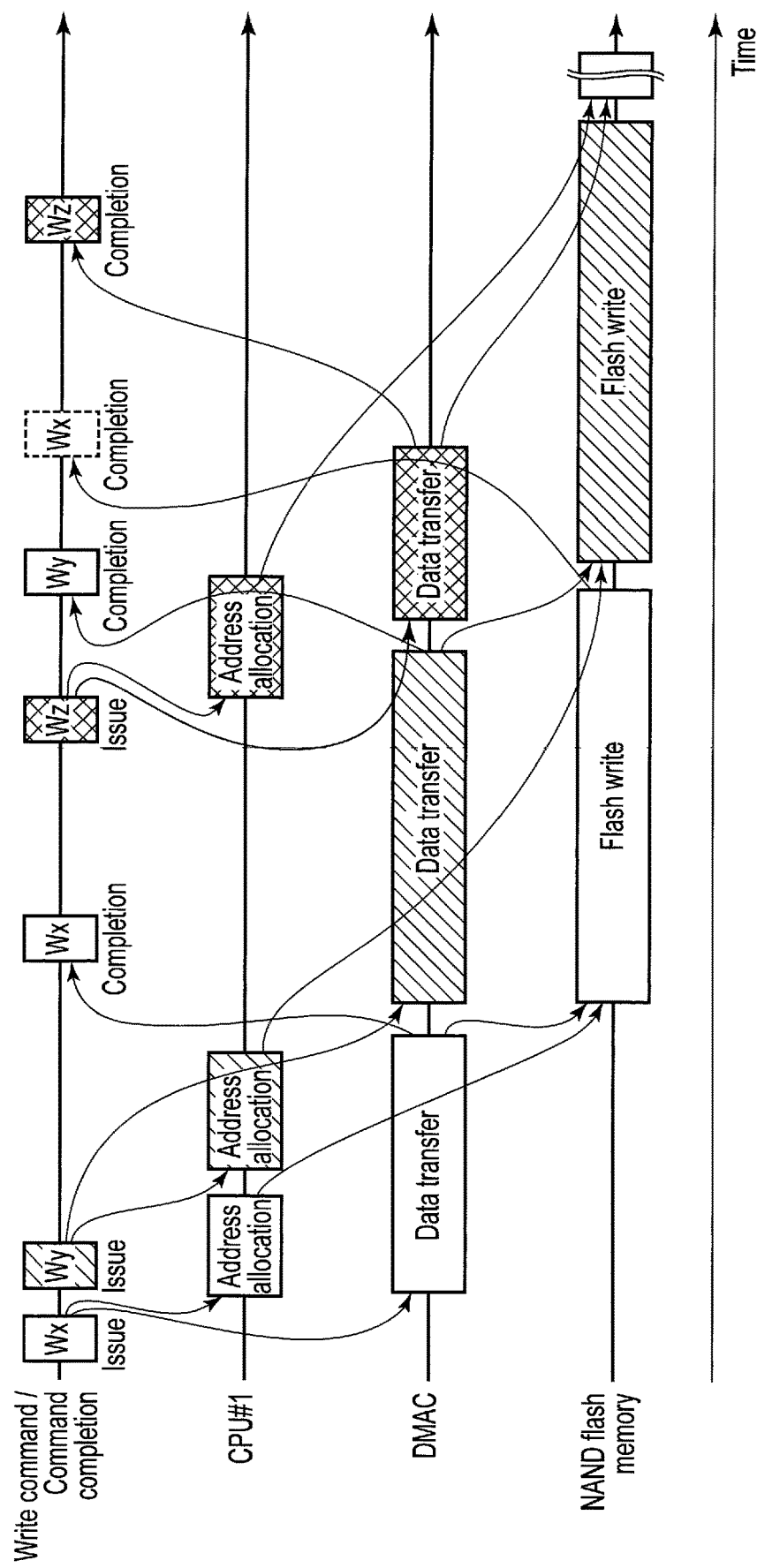
FIG. 10 is a diagram illustrating a sequence of a write operation executed in the memory system according to the embodiment.

FIG. 10 illustrates the sequence of the write operation executed in the SSD 3.

When a write command Wx is received from the host 2, a CPU #1 (e.g., the CPU 12-1) of the controller 4 determines a physical address (i.e., a block address, a page address, and an in-page offset) indicative of a physical storage location in the NAND flash memory 5 in which write data associated with the write command We is to be stored, and allocates the physical address to the write data (i.e., the address allocation operation). When the length of write data associated with a set of received write commands including the same stream ID as that of the write command We reaches the minimum write size, the DMAC 15 transfers write data having the minimum write size from the write buffer 51 of the host memory to the internal buffer 16. Then, the controller 4 writes the write data in the internal buffer 16 to the determined physical storage location in the NAND flash memory 5 (i.e., the flash write operation). Responses (completions) indicative of the completions of the write commands including the write command We are returned to the host 2 after the transfer of the write data to the internal buffer 16 is complete or after the flash write operation is complete.

When a write command Wy is received from the host 2, the CPU #1 (e.g., the CPU 12-1) of the controller 4 determines a physical address (i.e., a block address, a page address, and an in-page offset) indicative of a physical storage location in the NAND flash memory 5 in which write data associated with the write command Wy is to be stored, and allocates the physical address to the write data (i.e., the address allocation operation). When the length of write data associated with a set of received write commands including the same stream ID as that of the write command Wy reaches the minimum write size, the DMAC 15 transfers write data having the minimum write size from the write buffer 51 of the host memory to the internal buffer 16. Then, the controller 4 writes the write data in the internal buffer 16 to the determined physical storage location in the NAND flash memory 5 (i.e., the flash write operation). Responses (completions) indicative of the completions of the write commands including the write command Wy are returned to the host 2 after the transfer of the write data to the internal buffer 16 is complete or after the flash write operation is complete.

A write command Wz is also processed in the same way as the write commands Wx and Wy.

FIG. 11 illustrates respective configuration examples of the host 2 and the SSD 3 in relation to data read.

When the read control unit 22 receives a read command (e.g., R1) from the submission queue 71 of the host 2, the read control unit 22 refers to the L2P table 31 in the DRAM 6, and thereby acquires, from the L2P table 31, a physical address (i.e., a block address, a page address, and an in-page offset) indicative of a physical storage location in the NAND flash memory 5 which is allocated to a logical address of read target data specified by the read command.

When the read target data is readable from the NAND flash memory 5, the read control unit 22 sends a read instruction to read the read target data to the NAND flash memory 5 via the NAND interface 13, and reads the read target data from the NAND flash memory 5. The read target data which has been read may be temporarily stored in an internal read buffer 16' in the controller 4. The internal read buffer 16' may be realized by the SRAM in the controller 4 as in the case of the internal buffer 16.

The read control unit 22 transfers the read target data from the internal read buffer 16' to a read buffer 52 in the host memory, using the DMAC 15. A location in the read buffer 52 to which the read target data is to be transferred is specified by a data pointer included in the read command.

Then, the read control unit 22 returns a response indicative of the completion of the read command to the host 2, and puts the response indicative of the completion of the read command to the completion queue 72 of the host 2.

When the read target data has not become readable from the NAND flash memory 5, that is, when the read target data is data waiting for being written, which has not started being written, or data in the process of being written, which has started being written but cannot be normally read from the NAND flash memory 5, the read control unit 22 reads the read target data from the DRAM buffer 32 or the write buffer 51 in the host memory, and returns the read target data, which has been read, to the host 2. When reading the read target data from the write buffer 51 in the host memory, the read control unit 22 first transfers the read target data from the write buffer 51 to the internal read buffer 16', using the DMAC 15, and then transfers the read target data from the internal read buffer 16' to the read buffer 52 in the host memory, using the DMAC 15. When reading the read target data from the DRAM buffer 32, the read control unit 22 reads the read target data from the DRAM buffer 32 and writes the read target data to the internal read buffer 16', and then transfers the read target data from the internal read buffer 16' to the read buffer 52 in the host memory, using the DMAC 15.

The controller 4 may manage a buffer address of data which is to be written to a block and has not become readable, for each block currently used as a write destination block, using the write destination block management table 34. A buffer address corresponding to data which has been transferred to the DRAM buffer 32 and has not become readable from the NAND flash memory 5 is indicative of the location of the data in the DRAM buffer 32. A buffer address corresponding to data which has not been transferred to the DRAM buffer 32 and has not become readable from the NAND flash memory 5 is indicative of the location of the data in the write buffer 51 in the host memory. Thus, on the basis of a buffer address corresponding to read target data which has not become readable from the NAND flash memory 5, the read control unit 22 can read the read target data from the DRAM buffer 32 or the write buffer 51 in the host memory, and can return the read target data, which has been read, to the host 2.

Accordingly, the host 2 can receive desired data from the SSD 3 merely by executing the simple process of issuing read commands to the SSD 3 without executing the process of selectively issuing a read command to the write buffer 51 and a read command to the SSD 3.

Figure 12:
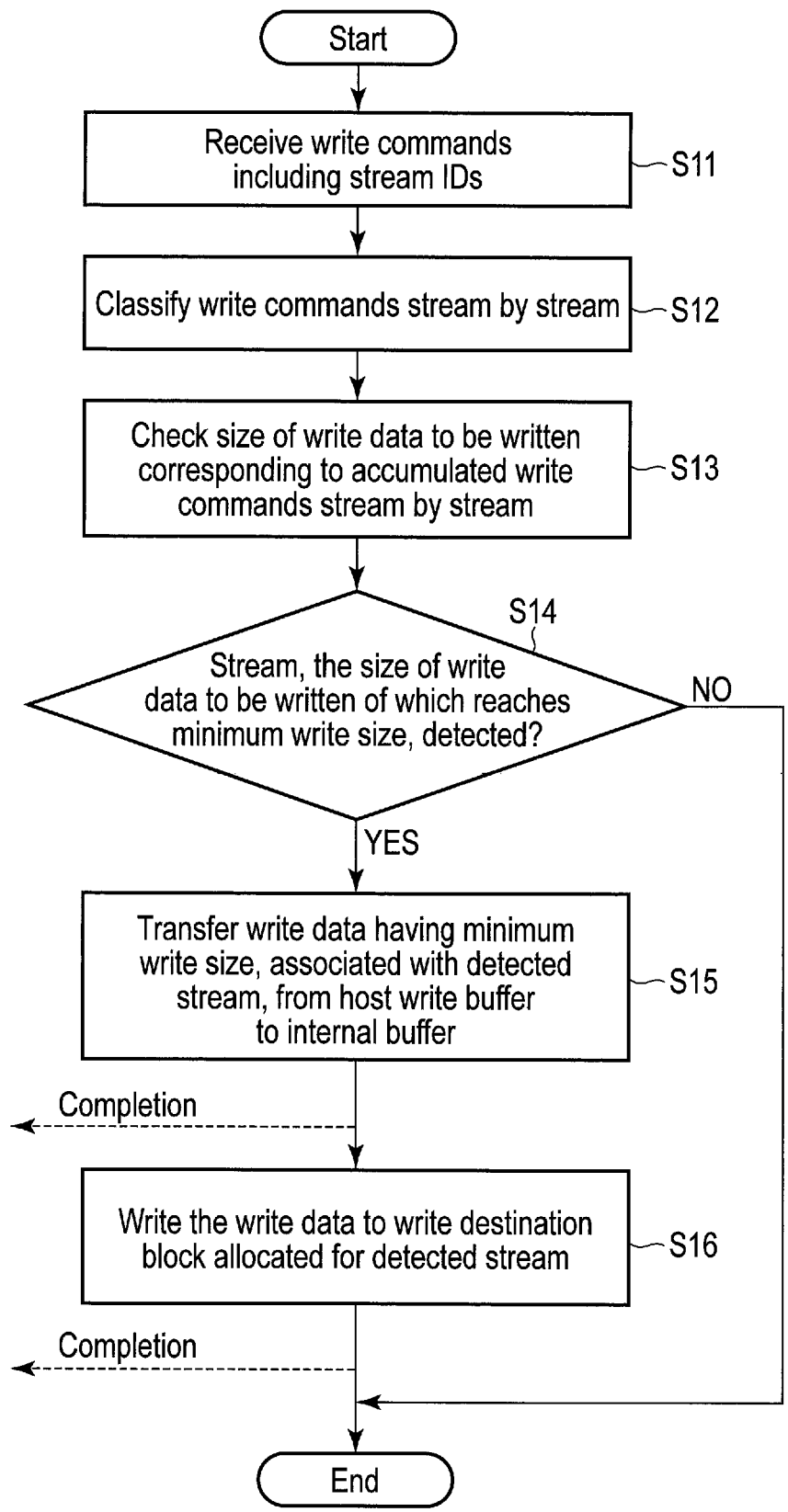
FIG. 12 is a flowchart illustrating a procedure for a write operation executed in the memory system according to the embodiment.

The flowchart of FIG. 12 illustrates a procedure for the write operation executed in the SSD 3.

The controller 4 receives write commands including stream IDs from the host 2 (step S11). The controller 4 classifies the received write commands stream by stream (step S12). In step S12, the controller 4 stores each of the received commands in one of the command queues 41-1 to 41-n, and thereby classifies the received write commands into a plurality of groups corresponding to the streams #1 to #n. Accordingly, each write command including the stream ID #1 is accumulated in the command queue 41-1, each write command including the stream ID #2 is accumulated in the command queue 41-2, and each write command including the stream ID #n is accumulated in the command queue 41-n.

The controller 4 checks the sizes of write data to be written corresponding to the accumulated write commands, stream by stream, and detects a stream, the size of write data to be written of which reaches the minimum write size of the NAND flash memory 5 (step S13). That is, in step S13, for each of the groups, the controller 4 calculates the total of lengths specified by write commands belonging to the same group, and thereby determines whether or not the length of write data (i.e., the size of write data to be written) associated with the set of write commands belonging to the same group reaches the minimum write size.

When the stream, the size of the write data to be written of which reaches the minimum write size, is detected (YES in step S14), the controller 4 transfers write data having the minimum write size, associated with the detected stream, from the write buffer 51 in the host memory to the internal buffer 16 (step S15). Then, the controller 4 writes the write data transferred to the internal buffer 16 to a write destination block allocated for the stream (step S16).

In addition, the controller 4 returns responses indicative of the completions of write commands associated with the stream to the host 2 after the data transfer in step S15 is complete or after the write to the write destination block in step S16 is complete.

Figure 13:
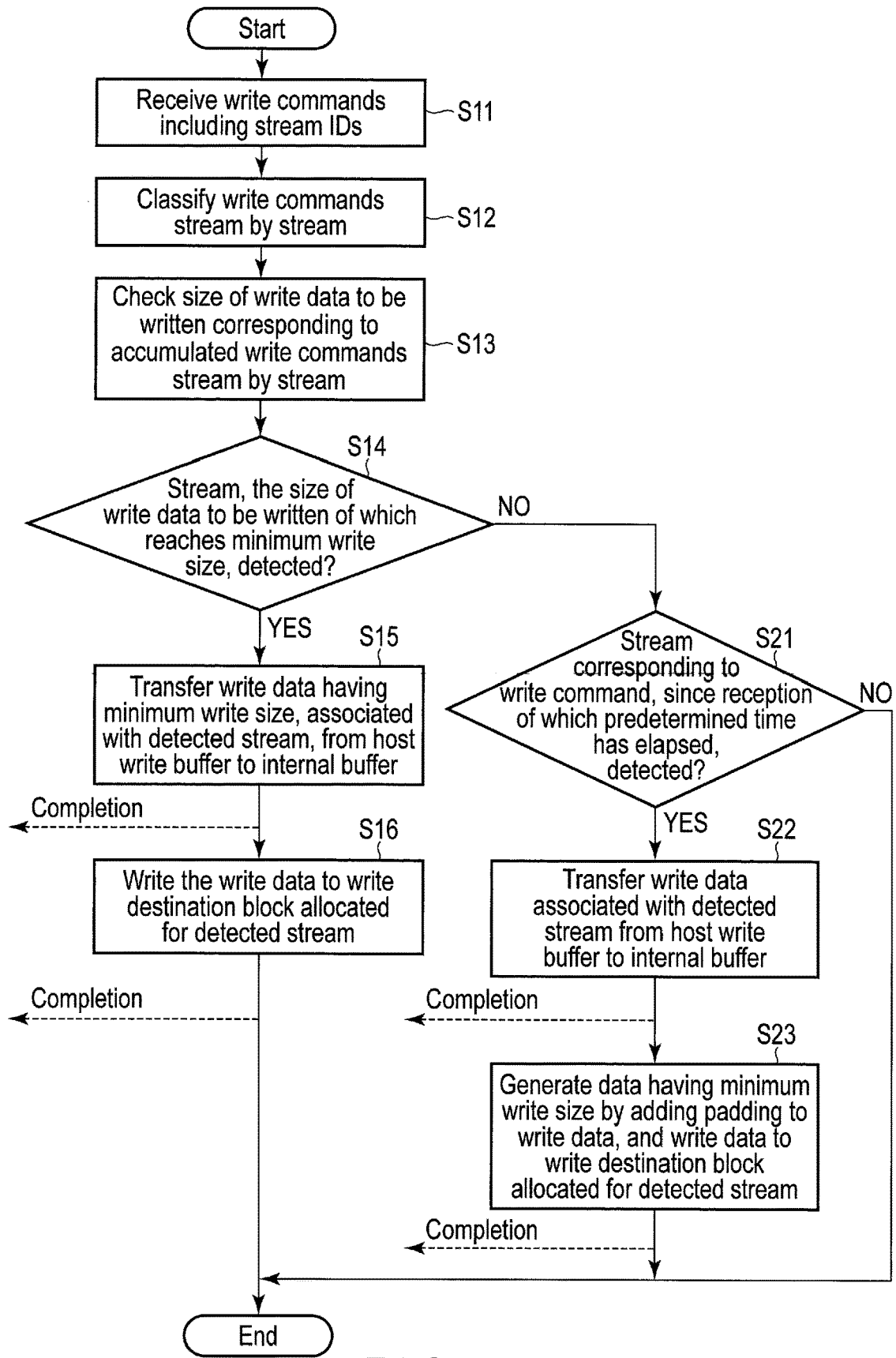
FIG. 13 is a flowchart illustrating another procedure for the write operation executed in the memory system according to the embodiment.

The flowchart of FIG. 13 illustrates another procedure for the write operation executed in the SSD 3.

In the write operation of FIG. 13, the processes of steps S21 to S23 are added to the processes of steps S11 to S16 of FIG. 12. The controller 4 checks the time that has elapsed since the reception of each write command.

When the stream, the size of the write data to be written of which reaches the minimum write size, is not detected (NO in step S14), the controller 4 detects whether or not there is a stream corresponding to a write command, since the reception of which a predetermined time has elapsed (step S21).

When the stream corresponding to the write command, since the reception of which the predetermined period has elapsed, is detected (YES in step S21), even when the length of write da to associated with a set of write commands corresponding to the detected stream does not reach the minimum write size, the controller 4 transfers the write data associated with the set of write commands corresponding to the detected stream from the write buffer 51 in the host memory to the internal buffer 16 (step S22).

The controller 4 generates data having the minimum write size by adding padding to the write data transferred to the internal buffer 16, and writes the generated data to a write destination block allocated for the detected stream (step S23).

In addition, the controller 4 returns responses indicative of the completions of write commands associated with the stream corresponding to the write command, since the reception of which the predetermined time has elapsed, to the host 2 after the data transfer in step S22 is complete or after the write to the write destination block in step S23 is complete.

The flowchart of FIG. 14 illustrates another procedure for the write operation executed in the SSD 3.

In the write operation of FIG. 14, the processes of steps S31 and S32 are added to the processes of steps S11 to S16 of FIG. 12. The controller 4 checks the time that has elapsed since the reception of each write command.

When the stream, the size of write data to be written of which reaches the minimum write size, is not detected (NO in step S14), the controller 4 detects whether or not there is a write command, since the reception of which a predetermined time has elapsed (step S31).

When it is detected that the predetermined time has elapsed since the reception of a write command corresponding to a stream (YES in step S31), the controller 4 transfers write data associated with the write command from the write buffer 51 in the host memory to the DRAM buffer 32 as write data for the stream (step S32). After the write data associated with the write command is transferred from the write buffer 51 in the host memory to the DRAM buffer 32, the controller 4 deletes the write command from a command queue in which the write command has been stored. Then, the controller 4 returns a response indicative of the completion of the write command to the host 2.

In this manner, when a predetermined time has elapsed since the reception of a write command corresponding to a stream, the controller 4 executes the process of transferring write data associated with the write command from the write buffer 51 in the host memory to the DRAM buffer 32 and the process of returning a response indicative of the completion of the write command to the host 2.

Moreover, in the structure wherein write data associated with a write command belonging to a group corresponding to a stream is transferred to the DRAM buffer 32 in this manner, the controller 4 performs data transfer from the write buffer 51 in the host memory to the internal buffer 16 on the condition that the total length of (i) the length of the write data transferred to the DRAM buffer 32 and (ii) the length of write data to be written, associated with a set of write commands belonging to the group corresponding to the stream, reaches the minimum write size.

Figure 15:
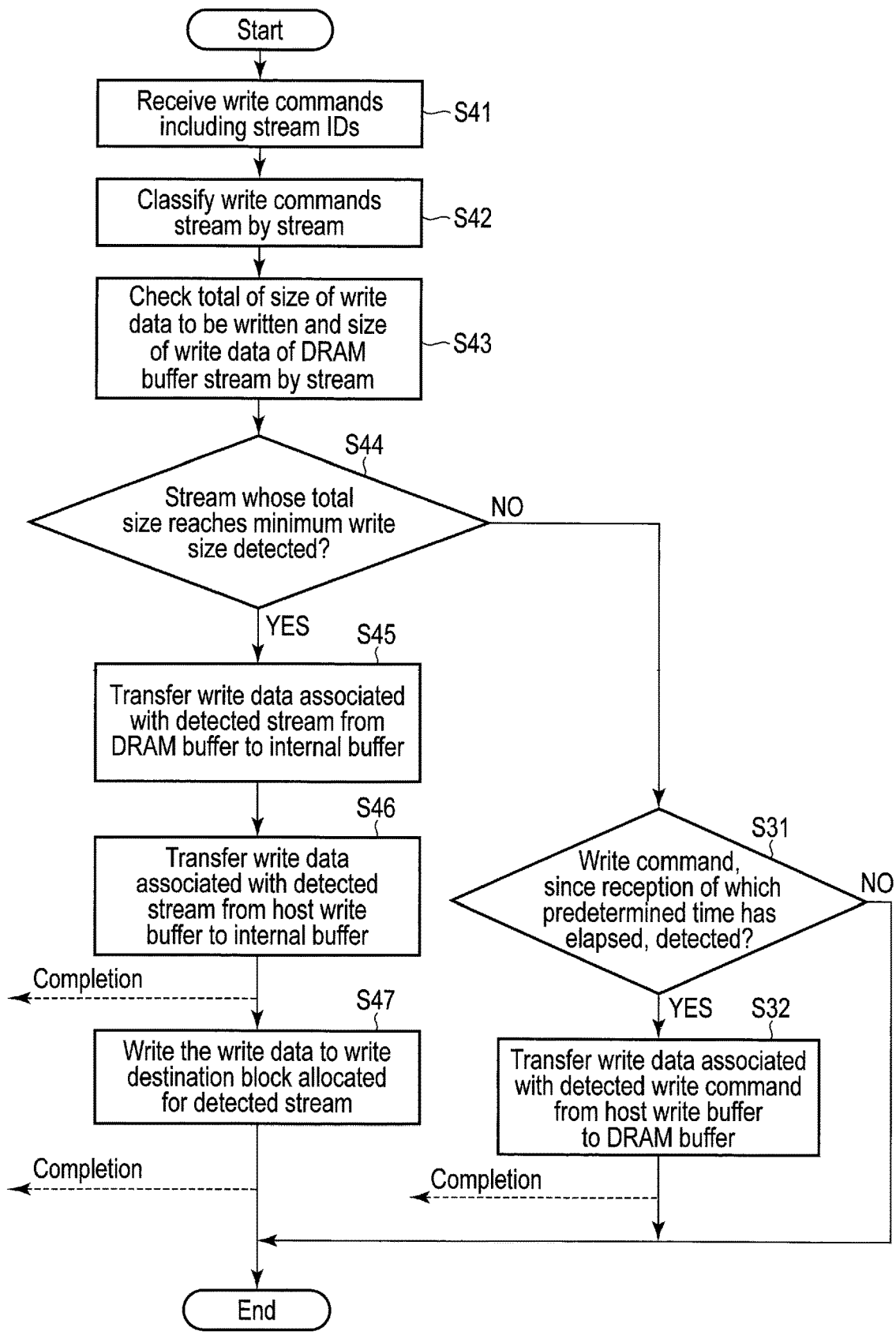
FIG. 15 is a flowchart illustrating another procedure for the write operation executed in the memory system according to the embodiment.

The flowchart of FIG. 15 illustrates a procedure for the write operation executed in the SSD 3, using the DRAM buffer 32.

The controller 4 receives writes commands including stream IDs from the host 2 (step S41). The controller 4 classifies the received write commands, stream by stream (step S42). In step S42, the controller 4 stores each of the received commands in one of the command queues 41-1 to 41-n, and thereby classifies the received write commands into a plurality of groups corresponding to the streams #1 to #n. Accordingly, each write command including the stream ID #1 is accumulated in the command queue 41-1, each write command including the stream ID #2 is accumulated in the command queue 41-2, and each write command including the stream ID #n is accumulated in the command queue 41-n.

The controller 4 checks the total size (i.e., total length) of (i) the size of write data to be written, corresponding to accumulated write commands, and (ii) the size of write data in the DRAM buffer 32, stream by stream, and detects a stream, the total size of which reaches the minimum write size of the NAND flash memory 5 (step S43). That is, in step S43, the controller 4 determines, for each of the groups, whether or not the total length of the length of write data to be written, associated with a set of write commands in a command queue, and the length of the write data in the DRAM buffer 32 reaches the minimum write size.

When the stream whose total length of the length of the write data to be written, associated with the set of write commands in the command queue, and the length of the write data in the DRAM buffer 32 reaches the minimum write size is detected (YES in step S44), the controller 4 transfers write data for the detected stream from the DRAM buffer 32 to the internal buffer 16 (step S45). The controller 4 transfers write data associated with the detected stream from the write buffer 51 in the host memory to the internal buffer 16 (step S46). Then, the controller 4 writes the write data transferred from the write buffer 51 in the host memory to the internal buffer 16 to a write destination block allocated for the stream, together with the write data transferred from the DRAM buffer 32 to the internal buffer 16 (step S47).

In addition, the controller 4 returns, to the host 2, responses indicative of the completions of write commands corresponding to the write data transferred from the write buffer 51 in the host memory to the internal buffer 16, after the data transfer in step S46 is complete or after the write to the write destination block in step S47 is complete. In addition, these write commands are deleted from the command queue.

When the stream whose total length of the length of the write data to be written and the length of the write data in the DRAM buffer 32 reaches the minimum write size is not detected (NO in step S44), the controller 4 executes the processes of steps S31 and S32 of FIG. 14.

That is, the controller 4 detects whether or not there is a write command, since the reception of which a predetermined time has elapsed (step S31). When it is detected that the predetermined time has elapsed since the reception of a write command corresponding to a stream (YES in step S31), the controller 4 transfers write data associated with the write command from the write buffer 51 in the host memory to the DRAM buffer 32 as write data for the stream (step S32). After the write data associated with the write command is transferred from the write buffer 51 in she host memory to the DRAM buffer 32, the controller 4 deletes the write command from a command queue in which the write command has been stored. Then, the controller 4 returns a response indicative of the completion of the write command to the host 2.

As described above, according to the present embodiment, for each of a plurality of groups corresponding to a plurality of streams, it is determined whether or not the length of write data associated with a set of write commands belonging to the same group reaches the minimum write size of the NAND flash memory 5. When the length of write data associated with a set of write commands belonging to a group corresponding to a stream reaches the minimum write size, write data having the minimum write size, associated with the set of write commands belonging to the group, is transferred from the write buffer 51 in the host memory to the internal buffer 16. Then, the write data transferred to the internal buffer 16 is written to a write destination block corresponding to the stream. When the write data is written to the write destination block, the storage area in the internal buffer 16 immediately becomes releasable. Thus, the internal buffer 16 becomes available for the transfer of write data having the minimum write size and corresponding to another stream. Therefore, substantially the same size as the minimum write size is sufficient as the size of the internal buffer 16.

Accordingly, the size of a buffer that needs to be provided in the SSD 3 can be reduced as compared to that in the structure wherein write data is transferred from the host 2 to the buffer in the SSD 3 whenever a write command is received from the host 2.

In the present embodiment, a NAND flash memory has been described as an example of a nonvolatile memory. However, the functions of the present embodiment are also applicable to other various nonvolatile memories, for example, a magnetoresistive random access memory (MRAM), a phase-change random access memory (PRAM), a resistive random access memory (ReRAM), and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host including a write buffer, comprising:
a nonvolatile memory including a plurality of blocks, each of the plurality of blocks including a plurality of pages, each of the plurality of pages being a unit for a data write operation and a data read operation; and
a controller configured to allocate a plurality of write destination blocks corresponding to a plurality of streams from the plurality of blocks; wherein
the controller is configured to:
manage a plurality of command queues, each of the plurality of command queues corresponding to each of the plurality of streams;
when receiving a first write command from the host, store the first write command in a first command queue of the plurality of command queues, the first write command specifying a stream identifier of a first stream of the plurality of streams, a first data pointer and a size of first write data, the first data pointer being a pointer indicating a location in the write buffer in which the first write data is stored, the first write data being write data to be written into the memory system;
when receiving a second write command from the host, store the second write command in a second command queue of the plurality of command queues, the second write command specifying a stream identifier of a second stream of the plurality of streams, a second data pointer and a size of second write data, the second data pointer being a pointer indicating a location in the write buffer in which the second write data is stored, the second write data being write data to be written into the memory system;
determine whether or not a total size reaches a minimum write size of the nonvolatile memory, the total size being a sum of a plurality of sizes, each of the plurality of sizes corresponding to write data associated with each of a plurality of write commands included in the first command queue, the minimum write size being determined based on a size of each of the plurality of pages;
when the total size reaches the minimum write size, transfer write data having the minimum write size and associated with the plurality of write commands included in the first command queue from the write buffer to a first buffer in the memory system based on a plurality of data pointers and the plurality of sizes of write data, each of the plurality of data pointers corresponding to write data associated with each of the plurality of write commands; and
write the write data transferred to the first buffer to a first write destination block of the plurality of write destination blocks, the first write destination block corresponding to the first stream.

2. The memory system of claim 1, wherein
the controller is configured to return responses indicative of completions of the plurality of write commands included in the first command queue to the host after transfer of the write data to the first buffer is complete or after write of the write data to the first write destination block is complete.

3. The memory system of claim 1, wherein
the controller is configured to calculate the total size based on the plurality of sizes specified by the plurality of write commands included in the first command queue, and determine whether or not the total size reaches the minimum write size.

4. The memory system oft claim 1, wherein
the controller is configured to:
when a first time has elapsed since reception of the second write command:
even when a total size of write data associated with a plurality of write commands included in the second command queue does not reach the minimum write size, transfer the write data associated with the plurality of write commands included in the second command queue from the write buffer to the first buffer; and
generate write data having the minimum write size by adding padding to the write data transferred to the first buffer, and write the Generated write data to a second write destination block of the plurality of write destination blocks, the second write destination block corresponding to the second stream.

5. The memory system of claim 1, wherein
the controller is configured to:
when a first time has elapsed since reception of the second write command:
transfer write data associated with the second write command from the write buffer to a second buffer in the memory system as write data for the second stream; and
return a response indicative of completion of the second write command.

6. The memory system of claim 5, wherein
the controller is configured to:
when a total size of (i) a size of the write data for the second stream stored in the second buffer and (ii) a size of write data associated with a plurality of write commands included in the second command queue reaches the minimum write size:
transfer the write data associated with the plurality of write commands included in the second command queue from the write buffer to the first buffer; and
write the write data transferred to the first buffer, together with the write data for the second stream stored in the second buffer, to a second write destination block of the plurality of write destination blocks, the second write destination block corresponding to the second stream.

7. The memory system of claim 1, wherein
the first buffer has a size equal to the minimum write size.

* * * * *